US012657266B2

(12) United States Patent
Ikeda et al.

(10) Patent No.: US 12,657,266 B2
(45) Date of Patent: Jun. 16, 2026

(54) MANDATE PROCESSING DEVICE, MANDATE PROCESSING METHOD, AND MANDATE PROCESSING SYSTEM

(71) Applicant: Hitachi, Ltd., Tokyo (JP)

(72) Inventors: Manami Ikeda, Tokyo (JP); Kosuke Anzai, Tokyo (JP); Akane Suzuki, Tokyo (JP); Natsuki Tsukano, Tokyo (JP); Non Kawana, Tokyo (JP); Takahiro Fujishiro, Tokyo (JP); Yukihiro Nishikawa, Tokyo (JP); Masami Ogawa, Tokyo (JP); Nodoka Onishi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 237 days.

(21) Appl. No.: 18/518,853

(22) Filed: Nov. 24, 2023

(65) Prior Publication Data

US 2024/0303304 A1 Sep. 12, 2024

(30) Foreign Application Priority Data

Mar. 9, 2023 (JP) ................................. 2023-036888

(51) Int. Cl.
*G06F 21/31* (2013.01)
*H04L 9/40* (2022.01)
(52) U.S. Cl.
CPC .............. *G06F 21/31* (2013.01); *H04L 63/12* (2013.01)
(58) Field of Classification Search
CPC ..... G06F 21/31; H04L 63/12; H04L 63/0807; H04L 63/10; G06Q 10/10
See application file for complete search history.

(56) References Cited

U.S. PATENT DOCUMENTS 5,918,222 A * 6/1999 Fukui ..................... G06Q 10/10
7,257,834 B1 * 8/2007 Boydstun ................ G06F 21/31
707/999.009

(Continued)

FOREIGN PATENT DOCUMENTS

JP 2003-099401 A 4/2003
JP 2016-051451 A 4/2016

OTHER PUBLICATIONS

Extended European Search Report dated May 22, 2024, directed to the EP counterpart application No. 23210948.8.

(Continued)

*Primary Examiner* — Aravind K Moorthy
(74) *Attorney, Agent, or Firm* — Procopio, Cory, Hargreaves & Savitch LLP

(57) ABSTRACT

A mandate processing device includes: a mandator setting unit, a mandate content setting unit, and a mandatary setting unit, which serve as a first presentation unit that, when a mandate is to be issued from a mandator to a mandatary, presents, as first input candidates, mandate information candidates, which can be determined based on user information of the mandator and the mandatary; a mandate condition setting unit serving as a second presentation unit that presents, as second input candidates, mandate condition candidates, which are the mandate information candidates other than the first input candidates and which are candidates for a mandate condition defined by the mandator as a condition for the mandatary; and a mandate information registration unit that registers mandate information which is information selected from the first input candidates and the second input candidates and for performing the mandate.

20 Claims, 29 Drawing Sheets

(56) References Cited

U.S. PATENT DOCUMENTS

| | | | | | |
|---|---|---|---|---|---|
| 8,082,323 | B2 * | 12/2011 | Yamaguchi | H04L 67/306 | 709/219 |
| 8,495,487 | B2 * | 7/2013 | Jerome | G06Q 40/00 | 715/224 |
| 8,645,387 | B2 * | 2/2014 | Hiltz-Laforge | G06F 16/335 | 707/740 |
| 8,806,605 | B1 * | 8/2014 | Chickering | H04L 63/10 | 709/224 |
| 9,015,798 | B1 * | 4/2015 | Matsuoka | G06F 21/31 | 726/16 |
| 9,412,097 | B2 * | 8/2016 | Jaffee | G06Q 10/1093 | |
| 9,569,626 | B1 * | 2/2017 | Brisebois | H04W 12/02 | |
| 9,571,500 | B1 * | 2/2017 | Chachar | G06F 3/14 | |
| 9,798,832 | B1 * | 10/2017 | Lessin | G06F 16/9024 | |
| 10,270,759 | B1 * | 4/2019 | Bordelon | G06F 9/4843 | |
| 10,382,445 | B1 * | 8/2019 | Mantel | G06Q 20/227 | |
| 11,144,365 | B1 * | 10/2021 | Gordon | G06F 9/5077 | |
| 11,233,772 | B1 * | 1/2022 | Dinan | G06F 21/6245 | |
| 11,562,191 | B1 * | 1/2023 | Pathak | G06Q 10/101 | |
| 11,575,676 | B1 * | 2/2023 | Banks | H04L 63/10 | |
| 11,775,898 | B1 * | 10/2023 | Thompson | G06Q 10/06315 | 707/999.102 |
| 11,783,325 | B1 * | 10/2023 | Strong | H04L 63/102 | 705/44 |
| 11,900,455 | B1 * | 2/2024 | Lawrence | G06Q 40/06 | |
| 12,039,066 | B1 * | 7/2024 | Sharma | G06F 21/6218 | |
| 12,082,303 | B2 * | 9/2024 | Lim | H04W 8/205 | |
| 12,155,641 | B1 * | 11/2024 | Soccorsy | H04L 63/102 | |
| 12,244,583 | B1 * | 3/2025 | Kurani | H04L 63/102 | |
| 12,287,861 | B2 * | 4/2025 | Yokomizo | G06F 21/31 | |
| 2003/0005299 | A1 * | 1/2003 | Xia | G06F 21/31 | 713/171 |
| 2003/0018913 | A1 | 1/2003 | Brezak et al. | | |
| 2004/0025048 | A1 * | 2/2004 | Porcari | G06Q 50/18 | 705/310 |
| 2004/0034799 | A1 * | 2/2004 | Mikami | G06F 16/954 | 726/28 |
| 2004/0267905 | A1 * | 12/2004 | McDonough | H04L 67/306 | 709/219 |
| 2005/0114523 | A1 * | 5/2005 | Barron | H04L 63/10 | 709/228 |
| 2005/0144230 | A1 | 6/2005 | Russo et al. | | |
| 2005/0198046 | A1 * | 9/2005 | McAuley | G06Q 10/10 | |
| 2005/0262043 | A1 * | 11/2005 | Saito | G06F 16/9535 | |
| 2005/0262132 | A1 * | 11/2005 | Morita | G06F 21/6218 | 707/999.102 |
| 2006/0098795 | A1 * | 5/2006 | Choti | H04L 63/10 | 379/114.14 |
| 2006/0143716 | A1 * | 6/2006 | Ikemoto | G06F 21/57 | 726/29 |
| 2006/0277594 | A1 * | 12/2006 | Chiavegatto | G06Q 10/10 | 726/1 |
| 2007/0171462 | A1 * | 7/2007 | Shoya | G06Q 10/10 | 358/1.15 |
| 2007/0179890 | A1 * | 8/2007 | Sandford | G06Q 40/00 | 705/44 |
| 2007/0282658 | A1 * | 12/2007 | Brintle | G06Q 10/063114 | 705/7.15 |
| 2008/0059500 | A1 * | 3/2008 | Symens | G06F 16/283 | |
| 2008/0127331 | A1 * | 5/2008 | Seidman | H04L 9/083 | 726/21 |
| 2008/0243999 | A1 * | 10/2008 | Pazhyannur | H04L 65/1089 | 717/177 |
| 2008/0301141 | A1 * | 12/2008 | Banjou | G06Q 10/10 | 707/999.009 |
| 2009/0099981 | A1 * | 4/2009 | Heuler | G06Q 10/0637 | 706/11 |
| 2009/0138276 | A1 * | 5/2009 | Hayashida | G06Q 10/10 | 705/325 |
| 2009/0241064 | A1 * | 9/2009 | Harris | G06F 9/451 | 715/841 |
| 2010/0036676 | A1 * | 2/2010 | Safdi | G16H 15/00 | 705/2 |
| 2010/0138899 | A1 * | 6/2010 | Yamamoto | G06F 21/31 | 709/229 |
| 2010/0211615 | A1 * | 8/2010 | Kawakami | G06F 16/284 | 707/812 |
| 2011/0225628 | A1 * | 9/2011 | Hirose | G06F 40/174 | 709/217 |
| 2011/0231280 | A1 * | 9/2011 | Farah | G06Q 10/10 | 705/26.8 |
| 2011/0302384 | A1 * | 12/2011 | Matsui | G06F 16/219 | 711/E12.001 |
| 2012/0131683 | A1 * | 5/2012 | Nassar | G06F 21/604 | 726/28 |
| 2012/0331539 | A1 * | 12/2012 | Matsugashita | G06F 21/6218 | 726/9 |
| 2013/0086640 | A1 * | 4/2013 | Hashimoto | G06F 21/606 | 726/4 |
| 2013/0269040 | A1 * | 10/2013 | Mullins | G06F 21/31 | 726/28 |
| 2013/0298202 | A1 * | 11/2013 | Warshavsky | H04L 69/24 | 726/4 |
| 2014/0007198 | A1 * | 1/2014 | Durbha | H04L 63/102 | 726/4 |
| 2014/0019880 | A1 * | 1/2014 | Kucera | G06F 21/31 | 715/753 |
| 2014/0058730 | A1 * | 2/2014 | Costa | H04W 4/90 | 704/235 |
| 2014/0123236 | A1 * | 5/2014 | Hirata | H04L 63/0807 | 726/4 |
| 2014/0129273 | A1 * | 5/2014 | Versteeg | G06F 21/604 | 705/7.14 |
| 2014/0137273 | A1 * | 5/2014 | Workman | G06F 21/6218 | 726/32 |
| 2014/0157381 | A1 * | 6/2014 | Disraeli | H04L 63/0853 | 726/7 |
| 2014/0215574 | A1 * | 7/2014 | Erb | H04L 63/10 | 726/4 |
| 2014/0282825 | A1 * | 9/2014 | Bitran | G06F 21/62 | 726/1 |
| 2014/0298483 | A1 * | 10/2014 | Kato | H04L 63/20 | 726/27 |
| 2014/0317692 | A1 * | 10/2014 | Somekawa | G06F 21/31 | 726/4 |
| 2015/0110401 | A1 * | 4/2015 | Tanaka | G06F 16/93 | 382/182 |
| 2015/0212659 | A1 * | 7/2015 | Roberts | G06F 3/0482 | 715/747 |
| 2015/0324579 | A1 * | 11/2015 | Qian | G06F 21/45 | 726/6 |
| 2016/0014107 | A1 * | 1/2016 | Hamauzu | H04L 63/10 | 726/5 |
| 2016/0099947 | A1 * | 4/2016 | Asai | H04L 51/043 | 726/28 |
| 2016/0191433 | A1 * | 6/2016 | Song | H04L 63/10 | 709/206 |
| 2016/0261616 | A1 * | 9/2016 | Shulman | H04L 63/10 | |
| 2016/0294832 | A1 * | 10/2016 | Pathak | H04L 63/101 | |
| 2017/0063862 | A1 * | 3/2017 | Guo | G06F 21/31 | |
| 2017/0116375 | A1 * | 4/2017 | Kuwayama | H04L 67/12 | |
| 2017/0134385 | A1 * | 5/2017 | Mitevski | H04L 63/0815 | |
| 2017/0149829 | A1 * | 5/2017 | Oshurkov | H04L 63/10 | |
| 2017/0193001 | A1 * | 7/2017 | Agrawal | G06Q 10/10 | |
| 2017/0269884 | A1 * | 9/2017 | Komatsu | G06F 3/1238 | |
| 2017/0331981 | A1 * | 11/2017 | Shionoiri | H04N 1/4433 | |
| 2018/0026954 | A1 * | 1/2018 | Toepke | G06F 21/31 | 726/4 |
| 2018/0032960 | A1 * | 2/2018 | Pannagl, Jr. | G06Q 10/1053 | |
| 2018/0041586 | A1 * | 2/2018 | Ueda | H04L 43/0817 | |
| 2018/0069896 | A1 * | 3/2018 | Urmanov | G06F 21/31 | |
| 2018/0081605 | A1 * | 3/2018 | Sakai | G06F 3/1222 | |
| 2018/0183961 | A1 * | 6/2018 | Kashiwagi | G06Q 30/0283 | |
| 2018/0248866 | A1 * | 8/2018 | Zhang | H04L 63/0815 | |
| 2018/0270216 | A1 * | 9/2018 | Nakayama | H04L 63/083 | |
| 2018/0276191 | A1 * | 9/2018 | Yamazoe | H04L 65/1083 | |
| 2018/0278603 | A1 * | 9/2018 | Yabe | H04L 63/08 | |
| 2018/0278802 | A1 * | 9/2018 | Okamoto | H04N 1/21 | |
| 2018/0330066 | A1 * | 11/2018 | Hase | G06F 21/305 | |
| 2018/0352430 | A1 * | 12/2018 | Mansour | H04W 12/069 | |

(56) References Cited

U.S. PATENT DOCUMENTS

| | | | | |
|---|---|---|---|---|
| 2018/0374048 | A1* | 12/2018 | Minami | H04L 63/10 |
| 2019/0068803 | A1* | 2/2019 | Ichikawa | H04N 1/00209 |
| 2019/0102369 | A1* | 4/2019 | Valloppillil | G06F 16/2358 |
| 2019/0114403 | A1* | 4/2019 | Zhang | G06F 21/121 |
| 2019/0236297 | A1* | 8/2019 | Efendiyev, Jr. | H04L 9/3226 |
| 2019/0311140 | A1* | 10/2019 | Braksator | G06F 16/903 |
| 2019/0340231 | A1* | 11/2019 | Tashiro | G06F 9/451 |
| 2020/0074015 | A1* | 3/2020 | De Vansa Vikramaratne | G06F 16/904 |
| 2020/0110598 | A1* | 4/2020 | Liu | G06F 21/31 |
| 2020/0314167 | A1* | 10/2020 | Achyuth | G06F 9/45545 |
| 2020/0327220 | A1* | 10/2020 | Daetz | G06F 21/31 |
| 2021/0004765 | A1* | 1/2021 | Creager | G06F 16/211 |
| 2021/0044588 | A1* | 2/2021 | Strezo | G06F 9/54 |
| 2021/0081552 | A1* | 3/2021 | Konita | G06F 21/31 |
| 2021/0117574 | A1* | 4/2021 | Abel | G06F 16/951 |
| 2021/0141912 | A1* | 5/2021 | Mowatt | G06F 21/62 |
| 2021/0144146 | A1* | 5/2021 | Hirokawa | G06Q 10/105 |
| 2021/0160335 | A1* | 5/2021 | Bellet | G06F 9/543 |
| 2021/0165899 | A1* | 6/2021 | Joshipura | G06F 16/144 |
| 2021/0218742 | A1* | 7/2021 | Cook | H04L 63/102 |
| 2021/0233094 | A1* | 7/2021 | Isaacs | G06F 3/04847 |
| 2021/0286861 | A1* | 9/2021 | Churchill | G06F 21/31 |
| 2021/0318998 | A1* | 10/2021 | Filip | G06F 16/245 |
| 2022/0012363 | A1* | 1/2022 | Colcord | G06F 16/2457 |
| 2022/0114265 | A1* | 4/2022 | Riggi | G06F 21/6227 |
| 2022/0345483 | A1* | 10/2022 | Shua | H04L 9/0825 |
| 2022/0393900 | A1* | 12/2022 | Ali | H04L 12/1827 |
| 2023/0005391 | A1* | 1/2023 | Sharma | G06F 21/62 |
| 2023/0028302 | A1* | 1/2023 | Kyleman | G06F 16/93 |
| 2023/0045558 | A1* | 2/2023 | Annas | G16H 15/00 |
| 2023/0089889 | A1* | 3/2023 | Sun | G06Q 10/40 715/753 |
| 2023/0096596 | A1* | 3/2023 | Cohen | G06Q 40/12 726/23 |
| 2023/0099324 | A1* | 3/2023 | Wahl | H04L 51/48 715/751 |
| 2023/0106268 | A1* | 4/2023 | Venkatesh | G06Q 10/06311 701/23 |
| 2023/0171242 | A1* | 6/2023 | Sethuraman | H04L 9/321 713/168 |
| 2023/0177462 | A1* | 6/2023 | Hamdi | G06F 16/93 715/751 |
| 2023/0208840 | A1* | 6/2023 | Venable | H04L 63/102 726/1 |
| 2023/0214521 | A1* | 7/2023 | Amico | H04W 4/44 726/1 |
| 2023/0216817 | A1* | 7/2023 | Boyd | H04L 51/10 709/206 |
| 2023/0328192 | A1* | 10/2023 | Aoyama | H04N 1/4433 358/1.14 |
| 2023/0412547 | A1* | 12/2023 | Rathi | H04L 51/216 |
| 2024/0061954 | A1* | 2/2024 | Doan | G06F 21/6245 |
| 2024/0106846 | A1* | 3/2024 | Kapoor | H04L 63/10 |
| 2024/0111601 | A1* | 4/2024 | Mei | G06F 8/433 |
| 2024/0256103 | A1* | 8/2024 | Solanki | G06F 21/629 |
| 2024/0265393 | A1* | 8/2024 | Jahagirdar | G06F 21/31 |
| 2024/0349032 | A1* | 10/2024 | Perarnau | H04W 8/205 |

OTHER PUBLICATIONS

Longhua Zhang, "A Rule-Based Framework for Role-Based Delegation and Revocation", ACM Transactions on Information and System Security, vol. 6, No. 3, Aug. 1, 2003 (Aug. 1, 2003), pp. 404-441, XP093160295, US. ISSN: 1094-9224. *p. 428-p. 432; figures 9,11*.

Notice of Reasons for Refusal received in JP2023-036888, dated Mar. 3, 2026, in 10 pages (with translation).

* cited by examiner

| MANDATE CONTENT | MANDATOR CONDITION | MANDATARY CONDITION |
|---|---|---|
| SIGNING KEY USAGE | HAS SIGNING KEY | ○○-QUALIFIED |
| ... | ... | ... |

MANDATE CONTENT TABLE

| CONDITION CONTENT |
|---|
| IN SAME DEPARTMENT |
| EMPLOYMENT POSITION: □□ OR HIGHER |
| ... |

MANDATE CONDITION TABLE

FIG. 9

| USERNAME | PW | ATTRIBUTE 1: DEPARTMENT | ATTRIBUTE 2: POSITION | ATTRIBUTE 3: OWNED RESOURCES | ATTRIBUTE 4: QUALIFICATIONS HELD |
|---|---|---|---|---|---|
| A-1 | srkelqk | DEPARTMENT α DEPARTMENT | DEPARTMENT MANAGER | SIGNING KEY (A-1) | — |
| B-1 | kwousl | DEPARTMENT β UNIT, α DEPARTMENT | SECTION MANAGER | — | ○○ |

311

ACCOUNT MANAGEMENT TABLE

| MANDATOR | MANDATE CONTENT | RESOURCE | MANDATE AUTHORITY | MANDATARY | MANDATE CONDITION | MANDATE INFORMATION REGISTRANT |
|---|---|---|---|---|---|---|
| A-1 | SIGNING KEY USAGE | SIGNING KEY (A-1) | SIGNING, REFERENCING | B-1 | ○○-QUALIFIED | C-1 |
| A-2 | SIGNING KEY USAGE | SIGNING KEY (A-2) | SIGNING, REFERENCING | B-2 | - | A-2 |

MANDATE INFORMATION MANAGEMENT TABLE

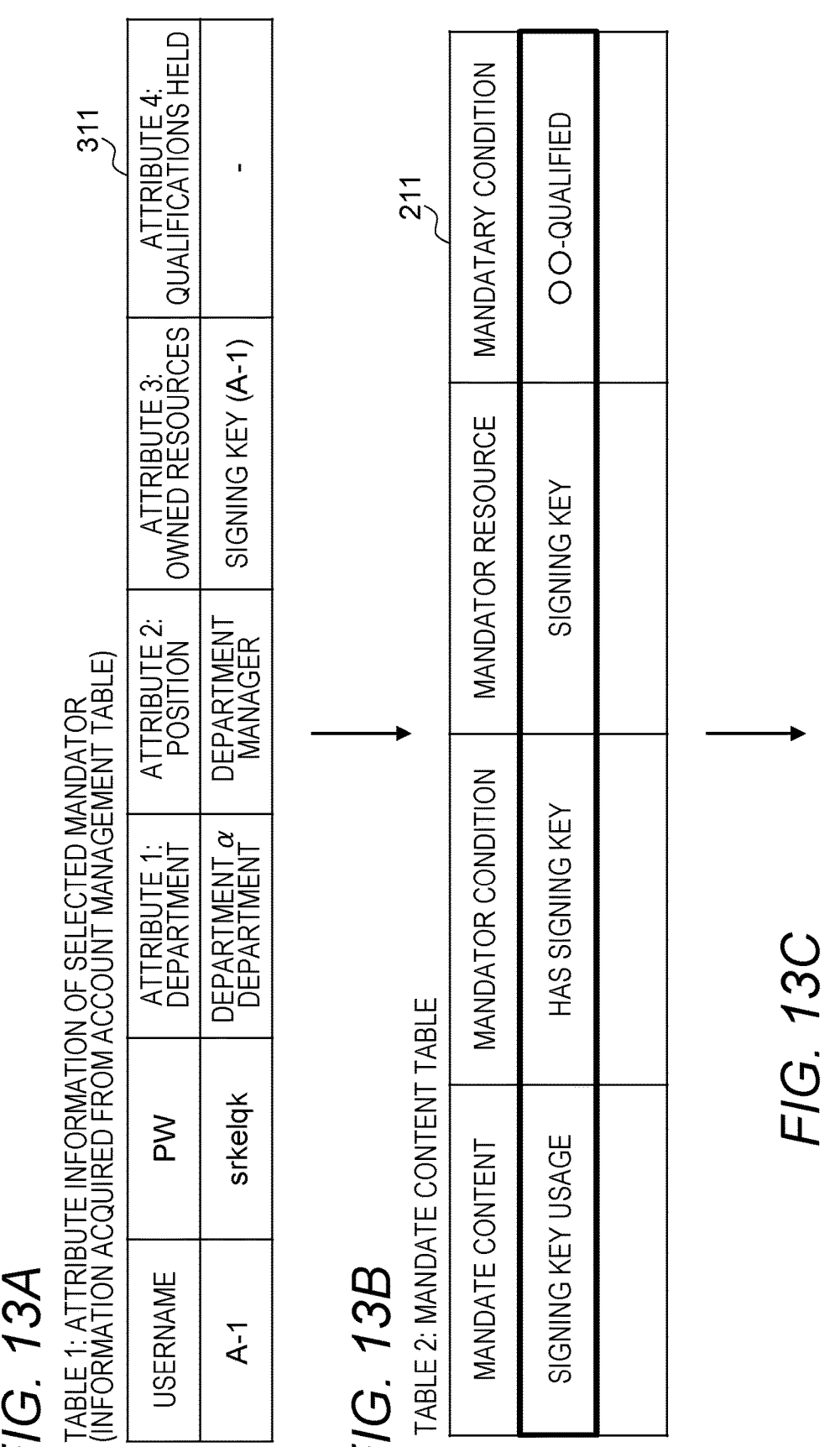

*FIG. 13A*

TABLE 1: ATTRIBUTE INFORMATION OF SELECTED MANDATOR
(INFORMATION ACQUIRED FROM ACCOUNT MANAGEMENT TABLE)

311

| USERNAME | PW | ATTRIBUTE 1: DEPARTMENT | ATTRIBUTE 2: POSITION | ATTRIBUTE 3: OWNED RESOURCES | ATTRIBUTE 4: QUALIFICATIONS HELD |
|---|---|---|---|---|---|
| A-1 | srkelqk | DEPARTMENT α DEPARTMENT | DEPARTMENT MANAGER | SIGNING KEY (A-1) | - |

*FIG. 13B*

TABLE 2: MANDATE CONTENT TABLE

211

| MANDATE CONTENT | MANDATOR CONDITION | MANDATOR RESOURCE | MANDATARY CONDITION |
|---|---|---|---|
| SIGNING KEY USAGE | HAS SIGNING KEY | SIGNING KEY | OO-QUALIFIED |

*FIG. 13C*

MANDATE CONTENT CANDIDATE #1
·MANDATE CONTENT: SIGNING KEY USAGE
·MANDATOR RESOURCE: SIGNING KEY (A-1)

FIG. 14

TABLE 3: SELECTED MANDATE CONTENT
(INFORMATION ACQUIRED FROM MANDATE CONTENT TABLE)

| MANDATE CONTENT | MANDATOR CONDITION | MANDATOR RESOURCE | MANDATARY CONDITION |
|---|---|---|---|
| SIGNING KEY USAGE | HAS SIGNING KEY | SIGNING KEY | ○ ○-QUALIFIED |

FIG. 17

SELECT MANDATOR NAME  Pm1

| MANDATOR NAME  ▽ |
| A-1 |
| A-2 |
| A-3 |
| A-4 |

MANDATOR NAME

A-1

SELECT MANDATE CONTENT  Pm2

| MANDATE CONTENT ▽ |
| USE SIGNING KEY |
| REFERENCE SIGNING KEY |

Bt4

RETURN     OK

FIG. 19

MANDATOR NAME

A-1

MANDATE CONTENT

USE SIGNING KEY

SELECT RESOURCE    Pm3

RESOURCE         ▽

SIGNING KEY (A-1)

Bt5

RETURN       OK

*FIG. 20*

MANDATOR NAME

A-1

MANDATE CONTENT

USE SIGNING KEY

RESOURCE

SIGNING KEY (A-1)

SELECT MANDATARY    Pm4

| MANDATARY ▽ |
|---|
| B-1 |
| B-2 |
| B-3 |
| B-4 |

Bt6

RETURN      OK

FIG. 21

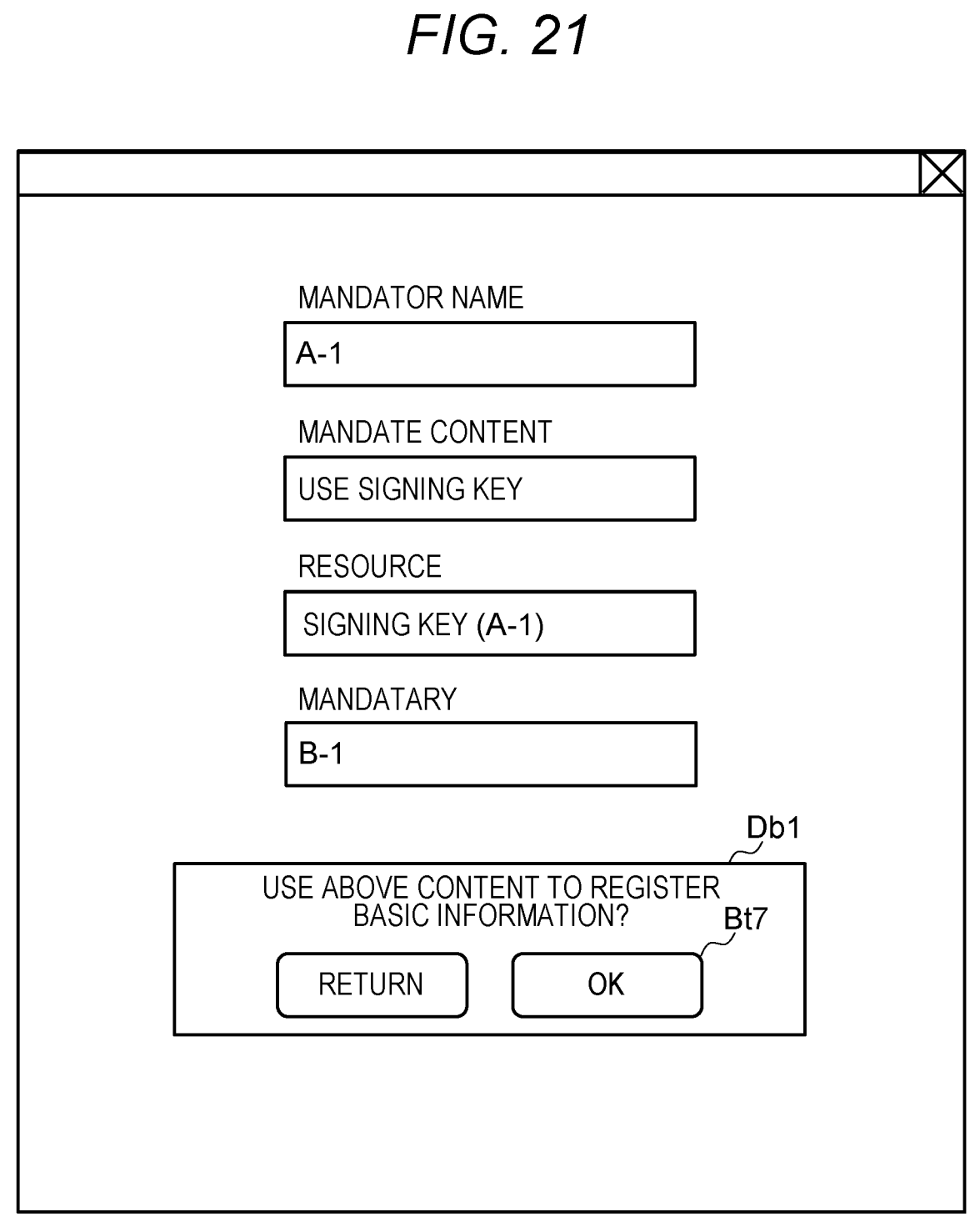

MANDATOR NAME

A-1

MANDATE CONTENT

USE SIGNING KEY

RESOURCE

SIGNING KEY (A-1)

MANDATARY

B-1

Db1

USE ABOVE CONTENT TO REGISTER
BASIC INFORMATION?        Bt7

| RETURN | OK |

FIG. 22

MANDATOR NAME

A-1

MANDATE CONTENT

USE SIGNING KEY

RESOURCE

SIGNING KEY (A-1)

MANDATARY

B-1

SELECT MANDATE CONDITION   Pm5

| MANDATE CONDITION ▽ |
| IN SAME DEPARTMENT |
| EMPLOYMENT POSITION: ☐☐ OR HIGHER |

Bt8

RETURN      OK

FIG. 23

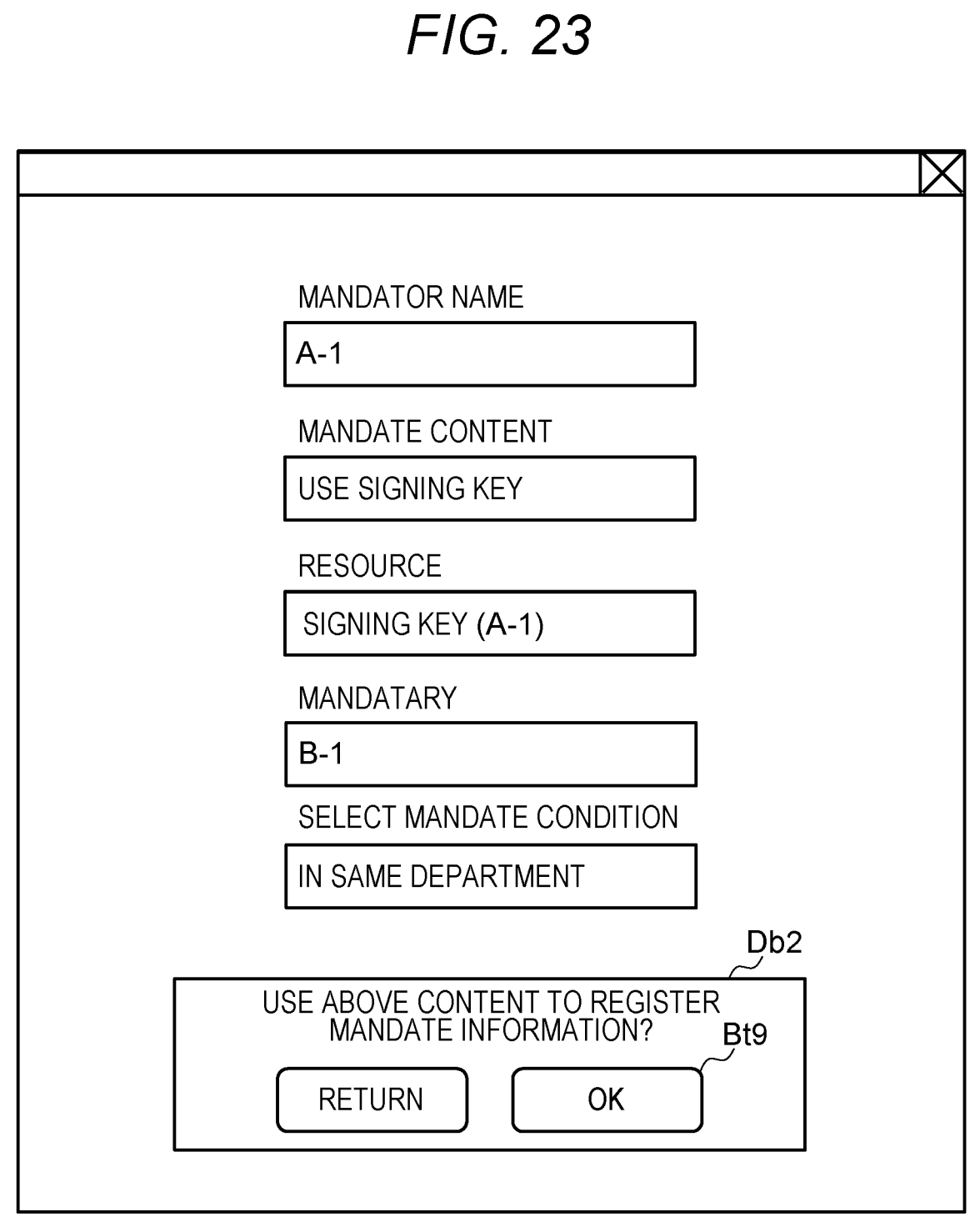

MANDATOR NAME

A-1

MANDATE CONTENT

USE SIGNING KEY

RESOURCE

SIGNING KEY (A-1)

MANDATARY

B-1

SELECT MANDATE CONDITION

IN SAME DEPARTMENT

Db2

USE ABOVE CONTENT TO REGISTER
MANDATE INFORMATION?

Bt9

RETURN          OK

*FIG. 25*

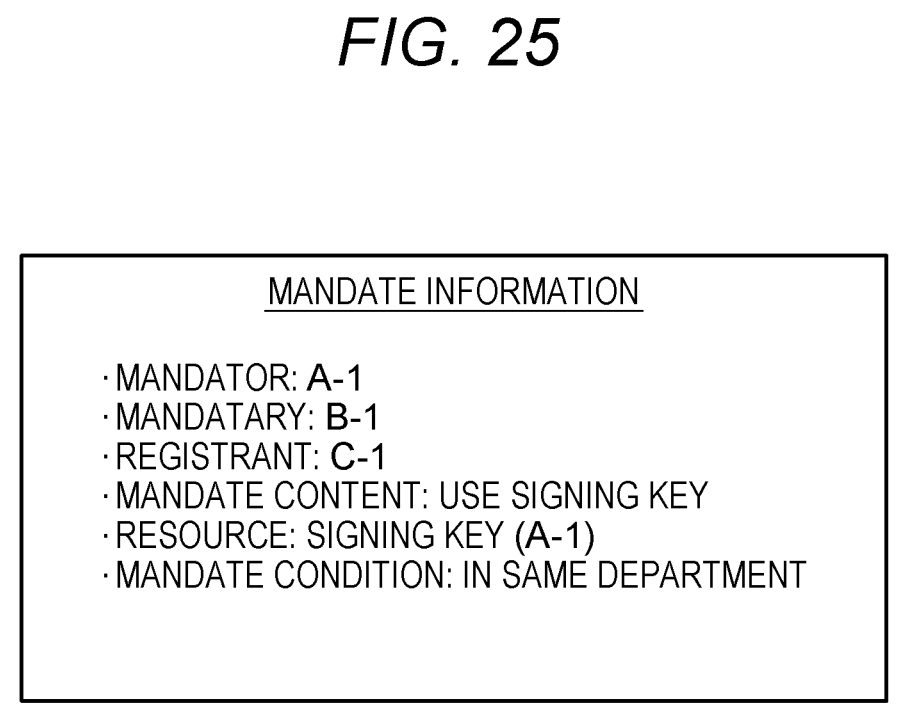

MANDATE INFORMATION

· MANDATOR: A-1
· MANDATARY: B-1
· REGISTRANT: C-1
· MANDATE CONTENT: USE SIGNING KEY
· RESOURCE: SIGNING KEY (A-1)
· MANDATE CONDITION: IN SAME DEPARTMENT

Figure 30:
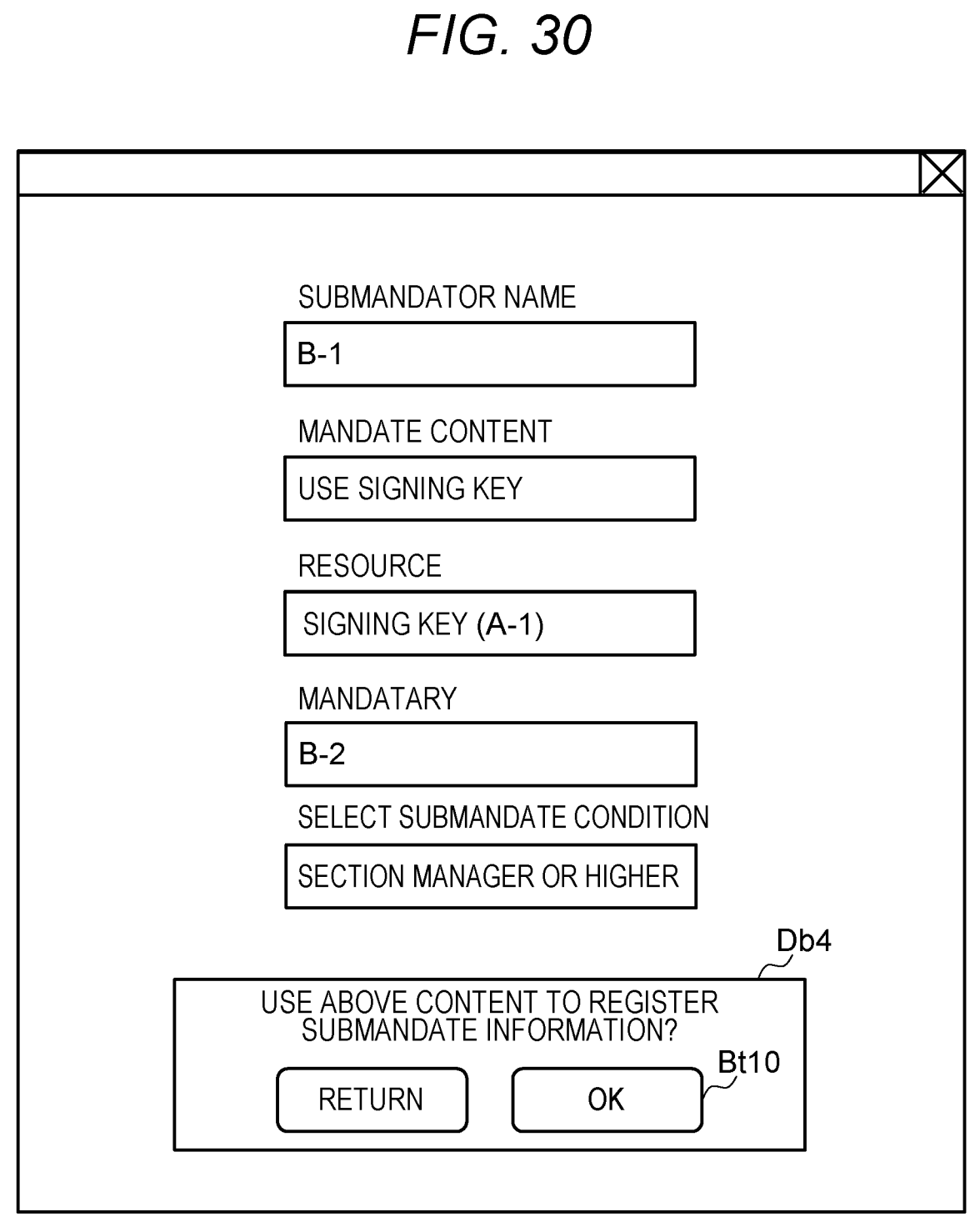

SUBMANDATOR NAME

B-1

MANDATE CONTENT

USE SIGNING KEY

RESOURCE

SIGNING KEY (A-1)

MANDATARY

B-2

SELECT SUBMANDATE CONDITION

SECTION MANAGER OR HIGHER

Db4

USE ABOVE CONTENT TO REGISTER
SUBMANDATE INFORMATION?

Bt10

RETURN          OK

MANDATE PROCESSING DEVICE, MANDATE PROCESSING METHOD, AND MANDATE PROCESSING SYSTEM

BACKGROUND OF THE INVENTION

1. Field of the Invention

The present invention relates to a mandate processing device, a mandate processing method, and a mandate processing system. The present invention particularly relates to a mandate processing device, a mandate processing method, and a mandate processing system that can be suitably used when an action to be performed by a mandator is delegated to a mandatary.

2. Description of the Related Art

In practice, mandate processing in which an action to be performed by a mandator is delegated to a mandatary is performed. In mandate processing, for example, it is necessary for the mandator to issue a mandate to the mandatary in advance, and when the mandatary is to perform the delegated action, authorization for the action of the mandatary is required on the side of the system performing mandate management. In a case where the action of the mandatary on the system side performing the mandate management is to be authorized, mandate information including mandate content is registered on the system side before performing the authorization processing, and the system side performing the mandate management performs the authorization based on the mandate information.

JP 2003-99401 A indicates that a server is configured to provide a trusted third-party organization with a ticket that authenticates the server, information regarding a target service that the server intends to access on behalf of the client, and a service ticket associated with the client. The service ticket can be provided by a client, or can be an issued service ticket issued to the server for the server itself in the name of the client. If the mandate is authorized according to a mandate constraint condition pertaining to the client, the trusted third-party organization issues a new service ticket for accessing the target service to the server in the name of the client.

In addition, JP 2016-51451 A indicates that an entrustment source assigns an access right to a document in a document management system to a primary contractor, and sets conditions of a client certificate and a user attribute to be satisfied by a secondary contractor, in a certificate condition table and a user attribute condition table. The primary contractor acquires a primary token by receiving authentication from an authentication-authorization server, and passes the primary token to the secondary contractor. The secondary contractor presents the primary token to the authentication-authorization server via an intermediate server and requests a secondary token. The authentication-authorization server provides the secondary token in a case where the secondary contractor satisfies the conditions of the certificate condition table and the user attribute condition table. The secondary contractor presents the secondary token when requesting the document.

SUMMARY OF THE INVENTION

However, in a case where a mandate information registrant registers, in the system performing mandate management, mandate information including mandate content, for example, the mandate information registrant needs to check the attribute information of the mandatary and the authority pertaining to the mandate content. Therefore, the mandate information registrant needs to collect the attribute information of the mandatary and the mandate content information, and thus the burden on the mandate information registrant is large. In addition, in registering the mandate information, in many cases, a registration item constituting the mandate information is manually inputted by the mandate information registrant. However, there are many condition settings associated with the mandate content and the mandator, and it is difficult to establish rules, and hence setting errors are likely to occur.

An object of the present invention is to provide a mandate processing device, a mandate processing method, and a mandate processing system that enable a mandate information registrant to register accurate mandate information more easily.

In order to solve the above problems, the present invention provides a mandate processing device including: a first presentation unit that, when a mandate is to be issued from a mandator to a mandatary, presents, as first input candidates, mandate information candidates, which is capable of being determined based on user information of the mandator and the mandatary and which is information for performing the mandate; a second presentation unit that presents, as second input candidates, mandate condition candidates, which are the mandate information candidates other than the first input candidates and which are candidates for a mandate condition defined by the mandator as a condition for the mandatary; and a mandate information registration unit that registers mandate information selected from the first input candidates and the second input candidates. In this case, it is possible to provide a mandate processing device that enables the mandate information registrant to more easily register accurate mandate information.

Here, the first input candidates may include mandator candidates determined based on user information. In this case, the mandate information registrant is able to more easily set a mandator by selecting the mandator from among the mandator candidates. It is also possible to suppress mandator setting errors.

Furthermore, a user satisfying a condition for becoming a mandator candidate can be selected as one of the mandator candidates based on the user information. In this case, a user suitable as a mandator can be selected.

Further, the first input candidates may further include mandate content candidates, which are candidates for mandate content required based on the authority of the mandator selected from among the mandator candidates. In this case, the mandate information registrant can more easily set mandate content by selecting the mandate content from the mandate content candidates. In addition, it is possible to suppress mandate content setting errors.

Moreover, the mandate content candidates can be obtained based on a resource owned by a mandator selected from among the mandator candidates. In this case, it is possible to extract suitable content as the mandate content.

Further, the first input candidates may include mandator resource candidates obtained from the mandate content candidates. In this case, the mandate information registrant may select a resource owned by the mandator from the resource candidates, and may more easily set the resource owned by the mandator.

Furthermore, the first input candidates may include mandatary candidates, which are candidates for the mandatary that are obtained based on an authority required by the mandatary and determined from the mandate content selected from among the mandate content candidates. In this case, the mandate information registrant can more easily set the mandatary by selecting the mandatary from the mandatary candidates. It is also possible to suppress mandatary setting errors.

Moreover, the mandate information may include information on the mandator, the mandate content, the resources owned by the mandatary and the mandator, and the mandate conditions. In this case, the mandate information may be mandate information reflecting the intentions of the mandate information registrant.

Further, the second presentation unit may verify whether the mandatary satisfies the mandate condition selected from among the mandate condition candidates. In this case, it is possible to select a mandatary suitable for the mandate condition.

Further, the mandate processing device may further include a submandate setting unit that sets a mandatary (submandatary) of a submandate when the mandatary issues a mandate (submandate) with respect to self-mandated mandate content, and the submandate setting unit may present submandatary candidates who are candidates for the submandatary. In this case, the mandate information registrant can more easily set the submandatary by selecting the submandatary from among the submandatary candidates. It is also possible to suppress submandatary setting errors.

The submandate setting unit may also make a range of conditions, which are set in the mandate information, the same or smaller each time a submandate is performed. In this case, the possibility of the mandate being performed by an unintended party when a submandate is to be performed is reduced.

Moreover, the conditions set in the mandate information may be at least one of a restriction on the number of submandates and a submandatable range. In this case, a submandate may be issued according to the intentions of the mandator.

Further, the submandate setting unit may make it possible to add conditions to be set in the mandate information. In this case, a mandate condition can be added for each submandatary.

Furthermore, the present invention provides a mandate processing method implemented by a processor executing a program recorded in memory, the method including: when a mandate is issued by a mandator to a mandatary, presenting, as first input candidates, mandate information candidates, which is capable of being determined based on user information of the mandator and the mandatary and which is information for performing the mandate; presenting, as second input candidates, mandate condition candidates, which are the mandate information candidates other than the first input candidates and which are candidates for a mandate condition defined by the mandator as a condition for the mandatary; and registering mandate information selected from the first input candidates and the second input candidates. In this case, it is possible to provide a mandate processing method in which a mandate information registrant is able to register accurate mandate information more easily.

In addition, the present invention provides a mandate processing system, including: a mandate processing device that, when a mandate is to be issued from a mandator to a mandatary, performs setting of mandate information; and a mandate management device that, based on the mandate information, grants the mandatary permission to process the mandate content, wherein the mandate processing device includes: a first presentation unit that, when a mandate is to be issued from the mandator to the mandatary, presents, as first input candidates, mandate information candidates, which is capable of being determined based on user information of the mandator and the mandatary and which is information for performing the mandate; a second presentation unit that presents, as second input candidates, mandate condition candidates, which are the mandate information candidates other than the first input candidates and which are candidates for a mandate condition defined by the mandator as a condition for the mandatary; and a mandate information registration unit that registers mandate information selected from the first input candidates and the second input candidates. In this case, it is possible to provide a mandate processing system that enables a mandate information registrant to register accurate mandate information more easily.

According to the present invention, it is possible to provide a mandate processing device, a mandate processing method, and a mandate processing system that enable a mandate information registrant to register accurate mandate information more easily.

BRIEF DESCRIPTION OF THE DRAWINGS

FIG. 7 is a diagram illustrating a data structure of a mandate content table;

FIG. 8 is a diagram illustrating a data structure of a mandate condition table;

FIG. 9 is a diagram illustrating a data structure of an account management table;

FIG. 10 is a diagram illustrating a data structure of a mandate information management table;

FIG. 13A is a diagram illustrating a case where the authority owned by the mandator is set to an attribute value of attribute information (information acquired from an account management table 311) of the mandator in S1208 of FIG. 12; FIG. 13B is a diagram illustrating processing to acquire mandate content candidates and resource candidates in the light of the authority of the mandator in S1209 of FIG. 12; FIG. 13C illustrates a result of acquiring mandate content candidates and resource candidates;

FIG. 14 is a diagram illustrating mandatary candidate condition calculation processing in S1212 of FIG. 12;

FIG. 17 illustrates a screen on which mandator candidates are presented on the screen in S1206 to S1207 in FIG. 12, and the mandate information registrant selects a mandator from among the mandator candidates and inputs the mandator;

FIG. 18 illustrates a screen on which mandate content candidates are presented on the screen in S1210 to S1211 in FIG. 12, and the mandate information registrant selects mandate content from among the mandate content candidates and inputs the mandate content;

FIG. 19 illustrates a screen on which resource candidates are presented on the screen in S1210 to S1211 in FIG. 12, and the mandate information registrant selects a resource from among the resource candidates and inputs the resource;

FIG. 20 illustrates a screen on which mandatary candidates are presented on a screen in S1215 to S1216 of FIG. 12, and the mandate information registrant selects a mandatary from among the mandatary candidates and inputs the mandatary;

FIG. 21 illustrates a screen for temporarily saving the content set up until FIG. 20 as basic information;

FIG. 22 illustrates a screen on which the mandate condition candidates are presented on the screen in S1502 to S1503 of FIG. 15, and the mandate information registrant selects a mandate condition from among the mandate condition candidates and inputs the mandate condition;

FIG. 23 illustrates a screen on which the mandate information registrant confirms and approves the mandate information in S1506 of FIG. 15;

FIG. 25 is a diagram illustrating registered mandate information;

FIG. 26 is a diagram to illustrate a submandate;

FIGS. 27(*a*) and 27(*b*) are diagrams illustrating a range of conditions set in the mandate information at the time of issuing a submandate;

FIG. 30 illustrates a screen on which the mandate information registrant confirms and approves submandate information.

DESCRIPTION OF THE PREFERRED EMBODIMENTS

Hereinafter, embodiments of the present invention will be described in detail with reference to the accompanying drawings.
<Overall Description of Mandate Processing System 1>

Figure 1:
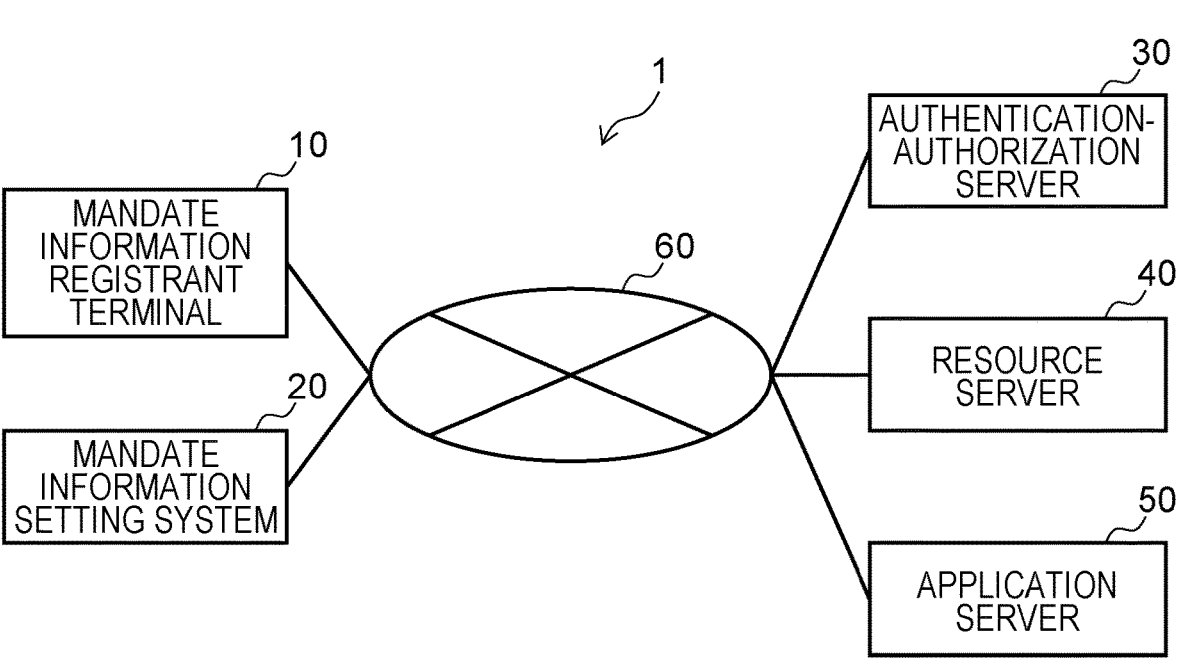
FIG. 1 is a diagram illustrating an overall configuration example of a mandate processing system to which the present embodiment is applied.

FIG. 1 is a diagram illustrating an overall configuration example of a mandate processing system 1 to which the present embodiment is applied.

As illustrated, the mandate processing system 1 includes a mandate information registrant terminal 10, a mandate information setting system 20, an authentication-authorization server 30, a resource server 40, and an application server 50. These parts are connected via a network 60.

The mandate information registrant terminal 10 is a terminal device operated by the mandate information registrant to register a mandate. Here, "mandate" means that the mandate information registrant entrusts a mandatary to perform a certain act. The "mandate" will sometimes be referred to as the representative or agent. Further, a "mandate information registrant" is a party who performs the setting of a mandate by using the mandate information registrant terminal 10. The mandate information registrant may be the mandator himself/herself or may be a party who operates the mandate information registrant terminal 10 instead of the mandator to register the mandate.

In addition, "mandate content" is processing content delegated by the mandator to the mandatary. The mandate content is not particularly limited, but is, for example, an action necessary when the mandator performs a task. This action corresponds to, for example, the creation and editing of an electronic document, the signing of an electronic document, settlement processing, and the like.

The mandate information setting system 20 is an example of a mandate processing device, and sets the mandate information when a mandate is issued by a mandator to a mandatary.

The authentication-authorization server 30 is an example of a mandate management device, and the mandatary grants permission to process the mandate content based on the mandate information. In the present embodiment, the authentication-authorization server 30 receives a request for mandatary authentication. After the authentication, the authentication-authorization server 30 grants the mandatary authorization to process the mandate content.

The resource server 40 has resources for processing the mandate content. When the mandatary receives authentication and permission from the authentication-authorization server 30, the resource server 40 grants authority to process the resource. The resource server 40 receives, from the mandatary, a request to process a resource according to mandate content, and returns a processing result to the mandatary.

The application server 50 executes application software with which the mandatary processes the mandate content. The mandatary executes the application software to process the mandate content to be performed on the resource server 40.

The network 60 is a communication means used for information communication between the mandate information registrant terminal 10, the mandate information setting system 20, the authentication-authorization server 30, the resource server 40, and the application server 50, and is, for example, the Internet, a local area network (LAN), or a wide area network (WAN). The network 60 may be used in combination regardless of whether same is wired or wireless. Furthermore, the network 60 may use a relay device such as a gateway device or a router and be connected via a plurality of communication lines.

Figure 2:
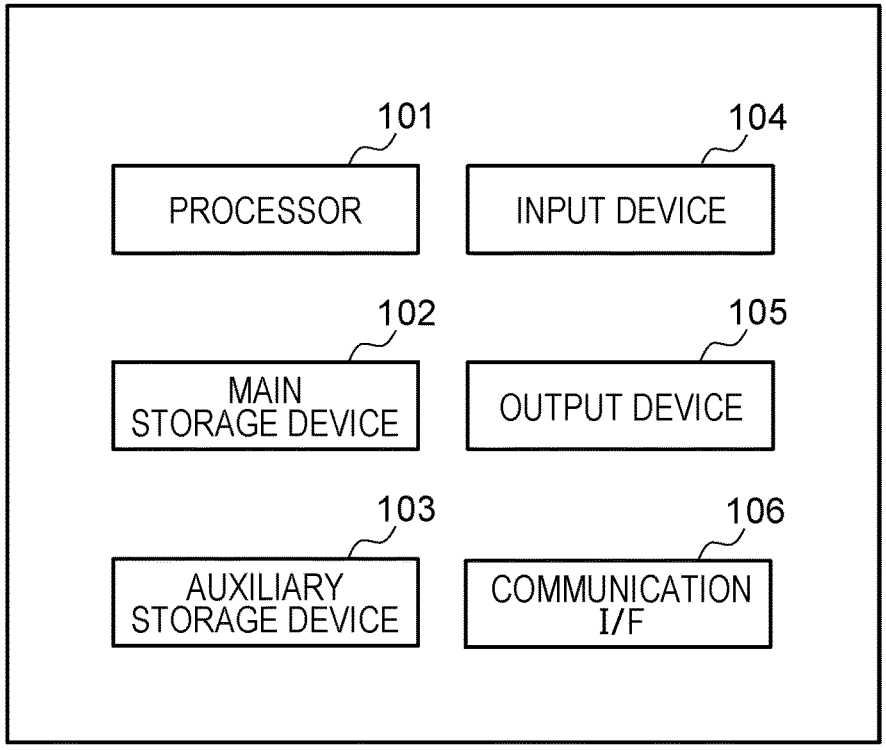
FIG. 2 is a diagram illustrating a hardware configuration of a mandate information registrant terminal, a mandate information setting system, an authentication-authorization server, a resource server, and an application server.

FIG. 2 is a diagram illustrating a hardware configuration of the mandate information registrant terminal 10, the mandate information setting system 20, the authentication-authorization server 30, the resource server 40, and the application server 50.

The foregoing components are computer devices such as a personal computer (PC) and a server computer. Further, as illustrated, the foregoing components include a processor 101 such as a central processing unit (CPU), and, as storage means, a main storage device 102 and an auxiliary storage device 103 such as a hard disk drive (HDD) or a solid state drive (SSD). Here, the processor 101 executes various kinds of software such as an OS (basic software) and an application program (application software). Furthermore, the main storage device 102 is a storage area that stores various software, data used for execution thereof, and the like, and the auxiliary storage device 103 is a storage area that stores input data for various software, output data from various software, and the like.

In addition, these devices include an input device 104 such as a keyboard, a mouse, and a touch panel, a display device 105 including a video memory, a display, and the like, and a communication interface (communication I/F) 106 for performing communication with the outside.

<Overall Description of Operation of Mandate Processing System 1>

Figures 3A, 3B:
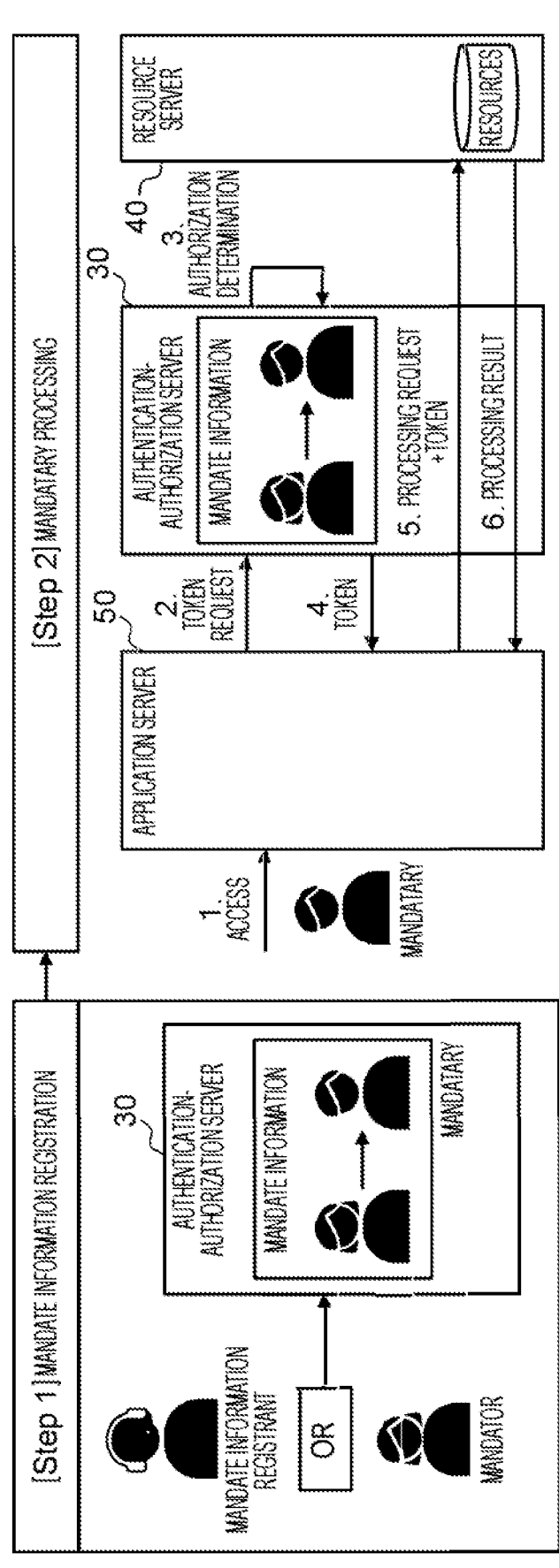
FIG. 3A is a diagram illustrating mandate information registration in which the mandate information registrant registers mandate information.
FIG. 3B is a diagram illustrating mandatary processing in which the mandatary uses the mandate processing system to process the mandate content.

FIGS. 3A and 3B are diagrams illustrating operations of the mandate processing system 1.

Among these drawings, FIG. 3A is a diagram illustrating, as Step 1, mandate information registration in which the mandate information registrant (mandator) registers mandate information.

Here, it is indicated that the mandate information registrant (mandator) registers mandate information including mandate content in the authentication-authorization server 30 in advance together with user information and a policy. As a result, preparation for a mandatary to process the mandate content is complete.

FIG. 3B is a diagram illustrating, as Step 2, mandatary processing in which the mandatary uses the mandate processing system 1 to process the mandate content.

First, the mandatary accesses the application server 50 (1. Access), and transmits a token requesting mandate authentication and authorization to the authentication-authorization server 30 (2. Token request). The authentication-authorization server 30 determines whether or not to grant the mandate to the mandatary based on the mandate information (3. Mandate permission). Further, in a case where permission is granted, the authentication-authorization server 30 returns a token indicating permission to the application server 50 (4. Token). Next, the mandatary makes a request to process resources in the resource server 40 via the application server 50, and sends a token for actually performing processing (5. Processing request+token). The resource server 40 then returns the processing result to the application server 50 (6. Processing result).

Here, when authorization to process the mandate content is performed for a general-purpose system using the resource server 40, authorization is performed by aggregating the authorization processing and the authentication processing in the authentication-authorization server 30 and returning an authorization determination result to the resource server 40.

In this case, it is necessary to store user information (including attribute information of the user and the like) used for the authorization determination by the authentication-authorization server 30 and an authorization determination policy in the authentication-authorization server 30 in advance. The advantages of such a method include, in addition to the convenience for the user of being able to manage their own information in one place (in this case, the authentication-authorization server 30), the convenience for the administrator of the loss/reduction in the amount of personal information to be managed, and so forth.

Therefore, in the systemization of mandate processing, there is a demand for handling authorization processing including that of mandates by using the general-purpose authentication-authorization server 30, similarly to the general-purpose system such as the resource server 40.

In addition, points in the registration of the mandate information illustrated in FIG. 3A include the following (1) to (3).

(1) The mandate information is registered using the content intended by the mandator.

This is because processing according to the mandate is performed by the mandatary under the liability of the mandator.

(2) The mandator shall delegate, to the mandatary, only mandate content based on the authority possessed by the mandator himself/herself.

This is because processing of the mandate is to be performed by the mandatary in place of the mandator.

(3) The mandatary has authority satisfying conditions according to the processing content and the mandator.

This is because legal problems may occur in addition to point (1).

On the other hand, as illustrated in FIG. 3A, there are the following problems (4) to (5) in a case where the mandate information registrant (mandator) is to register the mandate information.

(4) In a case where the mandator is to perform the registration, the burden of registration of the mandate information is large.

This is mainly because it takes time to confirm (3) above. That is, the mandator needs to check the attribute information of the mandatary and the authority pertaining to the mandate content, and for this purpose, the mandator needs to collect the attribute information of the mandatary and the mandate content information, for example.

(5) In a case where the mandate information registrant is to perform registration in place of the mandator, information different from the mandate content assumed by the mandator comes to be registered as the mandate information.

This is due to the fact that it is difficult to make rules in the light of the mandate content because the mandate conditions vary depending on the intentions of the mandator, that setting errors due to the mandate information being manually inputted are likely to occur, and that there may be a difference in recognition between the mandator and the mandate information registrant.

Therefore, in the present embodiment, when the mandate information illustrated in FIG. 3(*a*) is to be registered, the processing of the mandate processing system 1 is performed as follows, thereby solving the above problems. It is thus possible to improve the convenience and accuracy of mandate information registration.

<Description of Functional Configuration of Mandate Processing System 1>

Figure 4:
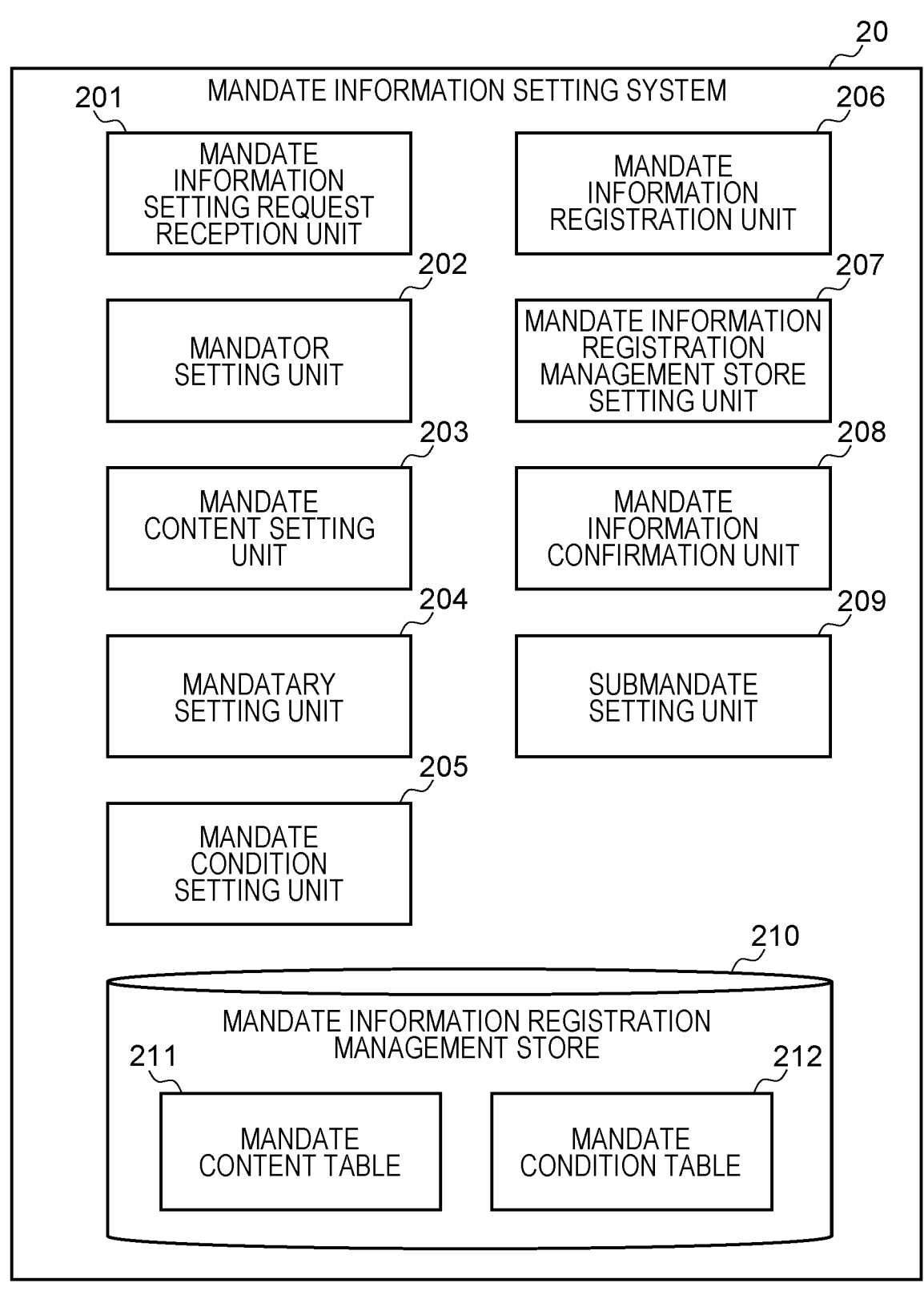
FIG. 4 is a block diagram illustrating a functional configuration example of a mandate information setting system.

FIG. 4 is a block diagram illustrating a functional configuration example of the mandate information setting system 20.

As illustrated, the mandate information setting system 20 includes a mandate information setting request reception unit 201, a mandator setting unit 202, a mandate content setting unit 203, a mandatary setting unit 204, a mandate condition setting unit 205, a mandate information registration unit 206, a mandate information registration management store setting unit 207, a mandate information confirmation unit 208, a submandate setting unit 209, and a mandate information registration management store 210.

The mandate information setting request reception unit 201 receives a mandate information setting request which is a request for setting the mandate information from the mandate information registrant.

The mandator setting unit 202 calculates a mandator candidate condition and acquires user information from the account management table 311 (see FIG. 5) of the authentication-authorization server 30. The mandator candidate condition is a condition for becoming a mandator candidate. Further, the mandator setting unit 202 obtains mandator candidates who are candidates for the mandator in the light of the mandator candidate condition and the user information, and presents the mandator candidate to the mandate information registrant. Further, when the mandate information registrant makes an input to select a mandator from among the mandator candidates, the mandator setting unit 202 acquires the input as a response.

The mandate content setting unit 203 calculates a mandate content candidate condition and acquires mandate content candidate information from the mandate content table 211 of the mandate information registration management store 210. The mandate content candidate condition is a condition for extracting a mandate content candidate. Further, the mandate content setting unit 203 obtains mandate content candidates in the light of the authority of the selected mandator, and presents the mandate content candidates to the mandate information registrant. The authority of the mandator can be acquired from attribute information of the selected mandator. Further, when the mandate information registrant makes an input to select mandate content from among the mandate content candidates, the mandate content setting unit 203 acquires the input as a response.

The mandatary setting unit 204 calculates a mandatary candidate condition, and acquires user information from the account management table 311 of the authentication-authorization server 30. The mandatary candidate condition is a condition for becoming a mandatary candidate. Mandatary candidates who are candidates for the mandatary are then obtained in the light of the mandatary candidate condition and the user information, and the mandatary candidates are presented to the mandate information registrant. Furthermore, when the mandate information registrant makes an input to select the mandatary from among the mandatary candidates, the mandatary setting unit 204 acquires the input as a response.

The mandate condition setting unit 205 acquires, from the mandate condition table 212, mandate condition candidates which are candidates for the mandate condition determined by the mandator as the mandatary condition. The mandate condition candidates are then presented to the mandate information registrant. Further, when the mandate information registrant makes an input to select a mandate condition from among the mandate condition candidates, the mandate condition setting unit 205 acquires the input as a response.

The mandate information registration unit 206 transmits a request to register the mandate information along with the mandate information to the authentication-authorization server 30. In the present embodiment, the mandate information includes information on a mandator, mandate content, resources owned by the mandator and the mandatary, and a mandate condition. In other words, the mandate information is information enabling the "mandator" to grant the "mandatary" the "processing content" with respect to the "resources owned by the mandator" under the "mandate condition". Note that, depending on the mandate content, the resources owned by the mandator may be unnecessary.

The mandate information registration management store setting unit 207 provides the mandate information registrant with a function for editing data in the mandate content table 211 and the mandate condition table 212 in the mandate information registration management store 210.

The mandate information confirmation unit 208 transmits a request to acquire mandate information to the mandate information setting unit 302 (see FIG. 5) of the authentication-authorization server 30, and presents the acquired mandate information to the mandate information registrant. In addition, the mandate information confirmation unit 208 receives a mandate information setting request and a submandate setting request.

When a submandate is issued from a mandatary to a submandatary, the submandate setting unit 209 sets the submandatary.

The mandate information registration management store 210 includes a mandate content table 211 and a mandate condition table 212.

The mandate content table 211 stores mandator conditions and mandatary conditions for mandate content, which is processing content to be mandated.

The mandate condition table 212 stores the condition content of mandate conditions.

Figure 5:
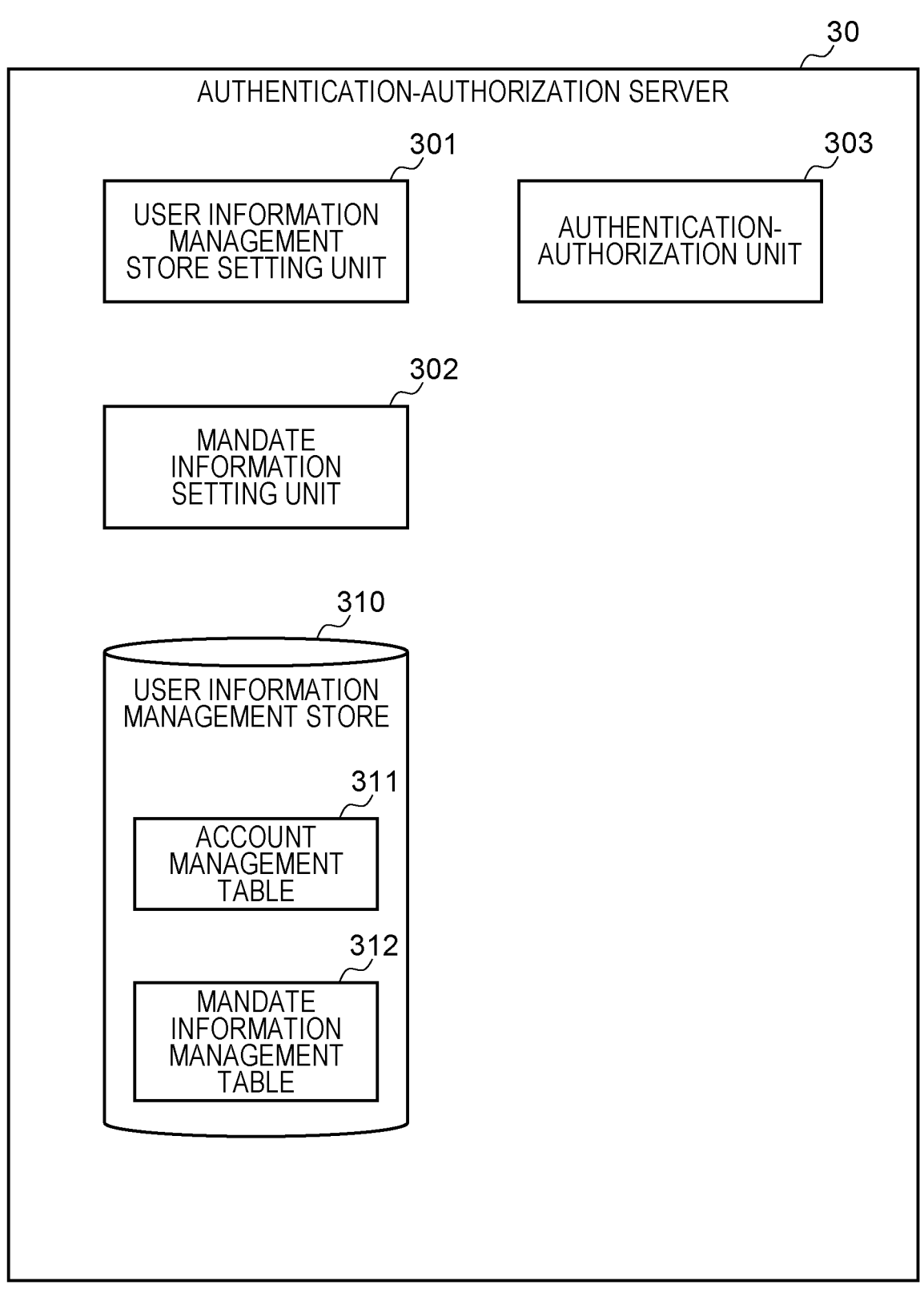
FIG. 5 is a block diagram illustrating a functional configuration example of an authentication-authorization server.

FIG. 5 is a block diagram illustrating a functional configuration example of the authentication-authorization server 30.

As illustrated, the authentication-authorization server 30 includes a user information management store setting unit 301, a mandate information setting unit 302, an authentication-authorization unit 303, and a user information management store 310.

The user information management store setting unit 301 sets data stored in the account management table 311 and a mandate information management table 312 of the user information management store 310.

When there is a request for registration of the mandate information from the mandate information setting system 20, the mandate information setting unit 302 sets the mandate information in the mandate information management table 312 of the user information management store 310.

The authentication-authorization unit 303 receives a request for authentication and authorization from the application server 50, performs authentication and authorization of the user from the data stored in the account management table 311 and the mandate information management table 312, and returns the result as a token.

The user information management store 310 includes the account management table 311 and the mandate information management table 312.

The account management table 311 stores user information which is information on users using the mandate processing system 1. The user information includes a username, attributes of the user associated with the username, and the like. The mandator or the mandatary is selected from among users for whom user information is stored in the account management table 311.

The mandate information management table 312 stores the mandate information sent from the mandate information setting system 20.

Figure 6:
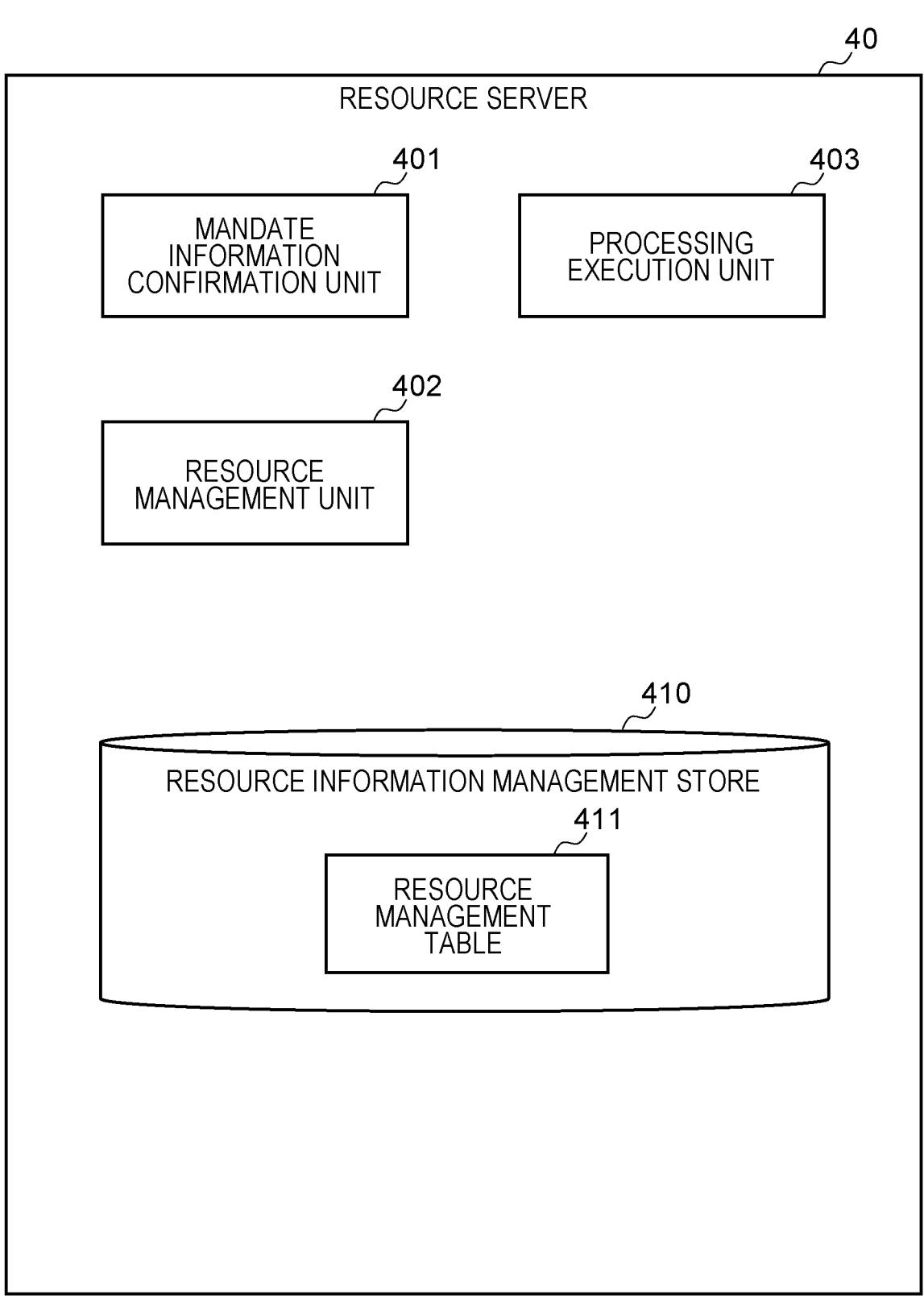
FIG. 6 is a block diagram illustrating a functional configuration example of a resource server.

FIG. 6 is a block diagram illustrating a functional configuration example of the resource server 40.

As illustrated, the resource server 40 includes a mandate information confirmation unit 401, a resource management unit 402, a processing execution unit 403, and a resource information management store 410.

The mandate information confirmation unit 401 confirms the mandate information when the mandatary issues a request to process resources in the resource server 40.

The resource management unit 402 manages the resources stored in the resource information management store 410.

The processing execution unit 403 executes processing using the resources stored in the resource information management store 410 based on the mandate information.

The resource information management store 410 includes a resource management table 411. The resource management table 411 manages the resources stored in the resource information management store 410.

FIG. 7 is a diagram illustrating a data structure of the mandate content table 211.

The mandate content table 211 includes items, namely, mandate content, mandator condition, mandator resource, and mandatary condition.

The mandate content is the content for performing the mandate described above. The mandator condition is a mandator condition required for the mandate content. The mandator resource is the resource owned by the mandator required to perform the mandate content. A resource can also be an element required for the mandator to perform a task. The mandatary condition is a mandatary condition required for the mandate content. Here, in a case where the mandate content is "signing key usage", it is indicated that the mandator condition is "has signing key" and the mandator resource is "signing key". Furthermore, in a case where the mandate content is "signing key usage", it is indicated that the condition of the mandatary is "○○-qualified".

FIG. 8 is a diagram illustrating a data structure of a mandate condition table 212.

The mandate condition table 212 includes predetermined condition content. Here, the condition content "in the same department" and the "employment position: □□ or higher" is prepared in advance as the condition content.

FIG. 9 is a diagram illustrating a data structure of the account management table 311.

The account management table 311 stores user information. The account management table 311 includes items which are: username, PW, attribute 1: department, attribute 2: position, attribute 3: resource, and attribute 4: qualifications held.

The username is the name or ID of the user. PW is a password for performing authentication. Attribute 1: department, Attribute 2: position, Attribute 3: resources, and Attribute 4: qualifications held are attribute information for the user, and denote the department to which the user belongs, the position of the user, the resources owned by the user, and the qualifications held by the user, respectively.

FIG. 10 is a diagram illustrating a data structure of the mandate information management table 312.

The mandate information management table 312 includes items, namely, mandator, mandate content, resource, mandate authority, mandatary, mandate condition, and mandate information registrant.

Among the foregoing items, the mandator, the mandate content, the mandatary, and the mandate information registrant are as described above. In addition, the resource is a resource of the mandator, and the mandate authority is an authority for performing a mandate.

<Detailed Description of Operation of Mandate Information Setting System 20>

Next, the operation of the mandate information setting system 20 will be described in detail. The mandate information setting system 20 sequentially performs the following processing 1 to 3.

(Processing 1)

The mandate information setting request reception unit 201, the mandator setting unit 202, the mandate content setting unit 203, and the mandatary setting unit 204 set mandate information in the light of the mandate information candidates that can be mechanically calculated based on user information prepared in advance, and the like. In processing 1, the mandator, the mandate content, the mandatary, and the resources owned by the mandator are set in the mandate information. As actual processing, these pieces of mandate information are set using an interactive mode between the mandate information setting system 20 and the mandate information registrant. That is, these pieces of mandate information are set in the following format: narrowing of input candidates based on user information and the like→presentation of input candidates→input (response) by mandate information registrant.

(Processing 2)

The mandate condition setting unit 205 sets mandate information that cannot be mechanically calculated based on user information or the like. In processing 2, a mandate condition is set in the mandate information. Here too, as actual processing, the mandate information is set using an interactive mode between the mandate information setting system 20 and the mandate information registrant. That is, a mandate condition is set in the following format: narrowing down of mandate conditions→presentation of input candidates→input (response) by mandate information registrant.

(Processing 3)

The mandate information registration unit 206 registers the set mandate information in the mandate information management table 312 of the authentication-authorization server 30.

Figure 11:
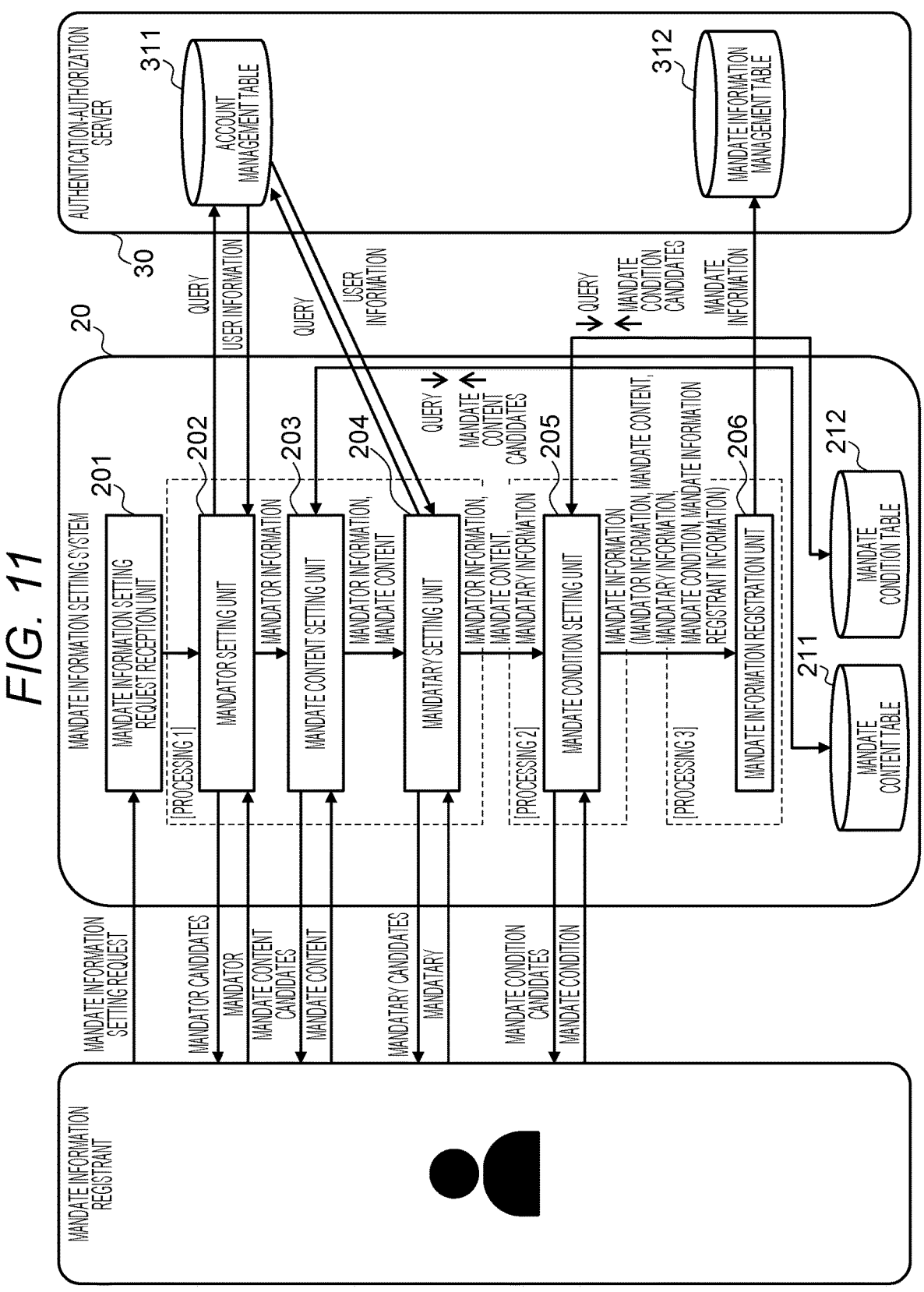
FIG. 11 is a diagram illustrating the overall operation of processing 1 to 3.
Figure 12:
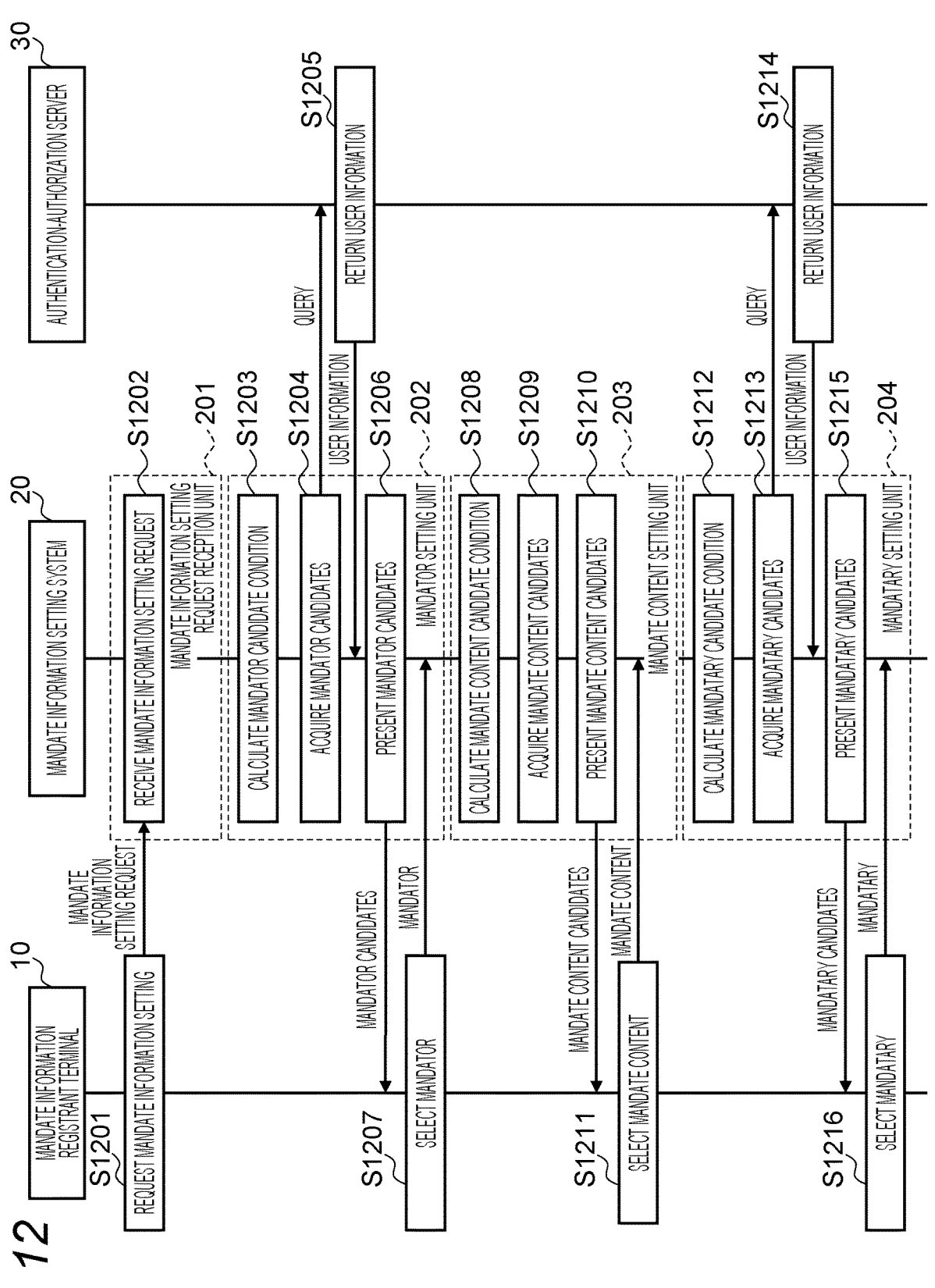
FIG. 12 is a sequence diagram illustrating processing 1.

FIG. 11 is a diagram illustrating the overall operation of Processing 1 to 3. FIG. 12 is a sequence diagram illustrating Processing 1.

Here, information exchange between the mandate information registrant terminal 10 (mandate information registrant), the mandate information setting system 20, and the authentication-authorization server 30 is illustrated.

Processing 1 will be described below with reference to FIGS. 11 and 12.

First, the mandate information registrant issues a mandate information setting request, which is a request to set mandate information, from the mandate information registrant terminal 10 (S1201). Next, the mandate information setting request reception unit 201 receives the mandate information setting request (S1202).

Next, the mandator setting unit 202 performs mandator candidate condition calculation processing as processing to calculate a mandator candidate condition that can be set by the mandate information registrant (S1203).

The mandate information registrant can be specified from logged-in user information or the like supplied by the mandate information registrant in S1201, for example. The mandator candidate condition is, for example, a condition that a party of the same affiliation can be set as a mandator in the light of the user information of the mandate information registrant. In addition, the mandator candidate condition is, for example, a condition that only the mandator himself/herself (the mandate information registrant himself/herself) can be set as a mandator. The setting of the mandator candidate condition may be determined in advance by the mandator setting unit 202, or a table for the setting candidates may be held in the mandate processing system 1 and the mandate information registrant may select the mandator candidate condition from the table at the time of the mandator candidate condition calculation processing.

Next, the mandator setting unit 202 acquires user information (including user attribute information) having the mandator candidate condition obtained in S1203, from the authentication-authorization server 30 (S1204). This action is performed by sending a query requesting the user information having the condition obtained in S1203 to the authentication-authorization server 30, and the authentication-authorization server 30 returning the corresponding user information (S1205).

Upon receiving the user information, the mandator setting unit 202 presents the corresponding users on the screen as mandator candidates (S1206). At the same time, the mandator setting unit 202 presents a screen for selecting a mandator candidate, and the mandate information registrant selects a mandator from among the mandator candidates and inputs the mandator (S1207). At this time, the mandator setting unit 202 may present only the names of the mandator candidates on the screen, or may also present a portion of the attribute information (for example, affiliation) on the screen.

By means of S1203 to S1207, the mandator setting unit 202 is capable of setting a mandator.

Next, the mandate content setting unit 203 performs mandate content candidate condition calculation processing as processing to calculate a mandate content candidate condition in the light of the attribute information of the mandator selected by the mandator setting unit 202 (S1208). Here, the mandate content candidate condition is the authority of the mandator.

The authority of the mandator is, for example, an attribute value of attribute information (information acquired from the account management table 311) of the mandator selected by the mandator setting unit 202. In addition, as the authority of the mandator, for example, a correspondence table of attribute values and authorities may be stored in the mandate processing system 1, and the authority of the mandator may be acquired from this table and the attribute value of the attribute information (information acquired from the account management table) of the mandator selected by the mandator setting unit 202.

Next, the mandate content setting unit 203 acquires settable mandate content candidates from the mandate content table 211 in the light of the authority of the mandator obtained in S1208. This action is performed by sending a query requesting mandate content candidates to the mandate content table 211 and acquiring the corresponding user information from the mandate content table 211. At the same time, resource candidates that are possible candidates for resources owned by the mandator are acquired from the user information (account management table 311) of the mandator (S1209).

Further, the mandate content setting unit 203 presents the mandate content candidates and the resource candidates on the screen (S1210). In addition, the mandate content setting unit 203 presents a screen for selecting a mandate content candidate and a resource candidate, and the mandate information registrant selects mandate content and a resource from among such candidates and inputs the mandate content and resource (S1211).

By means of S1208 to S1211, the mandate content setting unit 203 is capable of setting the mandate content and the resource owned by the mandator.

Next, the mandatary setting unit 204 performs mandatary candidate condition calculation processing as processing to calculate a mandatary candidate condition from the mandate content selected by the mandate content setting unit 203 (S1212). Here, the mandatary candidate condition is an authority required by the mandatary.

Next, the mandatary setting unit 204 acquires the user information of users having the authority from the authentication-authorization server 30 (S1213). This action is performed by sending a query requesting user information having the authority obtained in S1212 to the authentication-authorization server 30, and the authentication-authorization server 30 returning the corresponding user information (S1214).

Upon receiving the user information, the mandatary setting unit 204 presents the corresponding users on the screen as mandatary candidates (S1215). At the same time, the mandatary setting unit 204 presents a screen for selecting a mandatary candidate, and the mandate information registrant selects a mandatary from among the mandatary candidates and inputs the mandatary (S1216). At this time, the mandatary setting unit 204 may present only the names of the mandatary candidates on the screen, or may also present a portion of the attribute information (for example, affiliation) on the screen.

By means of S1212 to S1216, the mandatary setting unit 204 is capable of setting the mandatary.

When a mandate is to be issued from a mandator to a mandatary, the mandator setting unit 202, the mandate content setting unit 203, and the mandatary setting unit 204 function as a first presentation unit that presents, as first input candidates, mandate information candidates, which can be determined based on user information of the mandator and the mandatary and which is information for performing the mandate.

Here, as illustrated in S1206 of FIG. 11, the first input candidates include mandator candidates determined based on user information. Next, as illustrated in S1204 to S1205 of FIG. 11, users satisfying a condition for becoming a mandator candidate are selected as the mandator candidates based on the user information.

Further, as illustrated in S1210 in FIG. 11, the first input candidates may further include mandate content candidates, which are candidates for mandate content required based on the authority of the mandator selected from among the mandator candidates.

Further, as illustrated in S1215 of FIG. 11, the first input candidates include mandatary candidates, which are candidates for the mandatary that are obtained based on an authority required by the mandatary and determined from the mandate content selected from among the mandate content candidates.

FIG. 13A is a diagram illustrating a case where the authority owned by the mandator is set to an attribute value of attribute information (information acquired from the account management table 311) of the mandator in S1208 of FIG. 12.

FIG. 13B illustrates the account management table 311 illustrated in FIG. 9. Here, a case where a user having the username A-1 is set as the mandator is illustrated. Next, a case is illustrated where the authority of a user A-1 who is the mandator is set to attribute 3, which is the attribute value of the account management table 311. In this case, attribute 3 is the owned resource, which, in the case of user A-1, is "signing key (A-1)".

FIG. 13B is a diagram illustrating processing to acquire mandate content candidates and resource candidates in the light of the authority of the mandator in S1209 of FIG. 12.

FIG. 13B is a table created based on the mandate content table 211 illustrated in FIG. 7. Here, it can be seen that when the mandate content is "signing key usage", the mandator condition is "has signing key" and the mandator-owned resource is "signing key".

The mandate content setting unit 203 sets the authority of the user A-1 as "signing key (A-1)" in the light of the account management table 311, and sets a settable mandate content candidate as "signing key usage" in the mandate content table 211. In addition, the mandate content setting unit 203 sets the resource candidate to "signing key (A-1)" in the account management table 311 because, according to the mandate content table 211, the condition of the mandator is "has signing key" and the owned resource of the mandator is "signing key". FIG. 13C illustrates a result of acquiring mandate content candidates and resource candidates.

Thus, the mandate content candidates are obtained based on a resource owned by a mandator selected from among the mandator candidates.

Further, the first input candidates may include mandator resource candidates obtained from mandate content candidates.

FIG. 14 is a diagram illustrating mandatary candidate condition calculation processing in S1212 of FIG. 12.

FIG. 14 is a diagram similar to FIG. 13B and is a table created based on the mandate content table 211. The mandatary setting unit 204 sets a mandatary condition in the mandate content table 211 as the authority required by the mandatary. Here, it is indicated that "being ○○-qualified" is set as the authority required by the mandatary.

Figure 15:
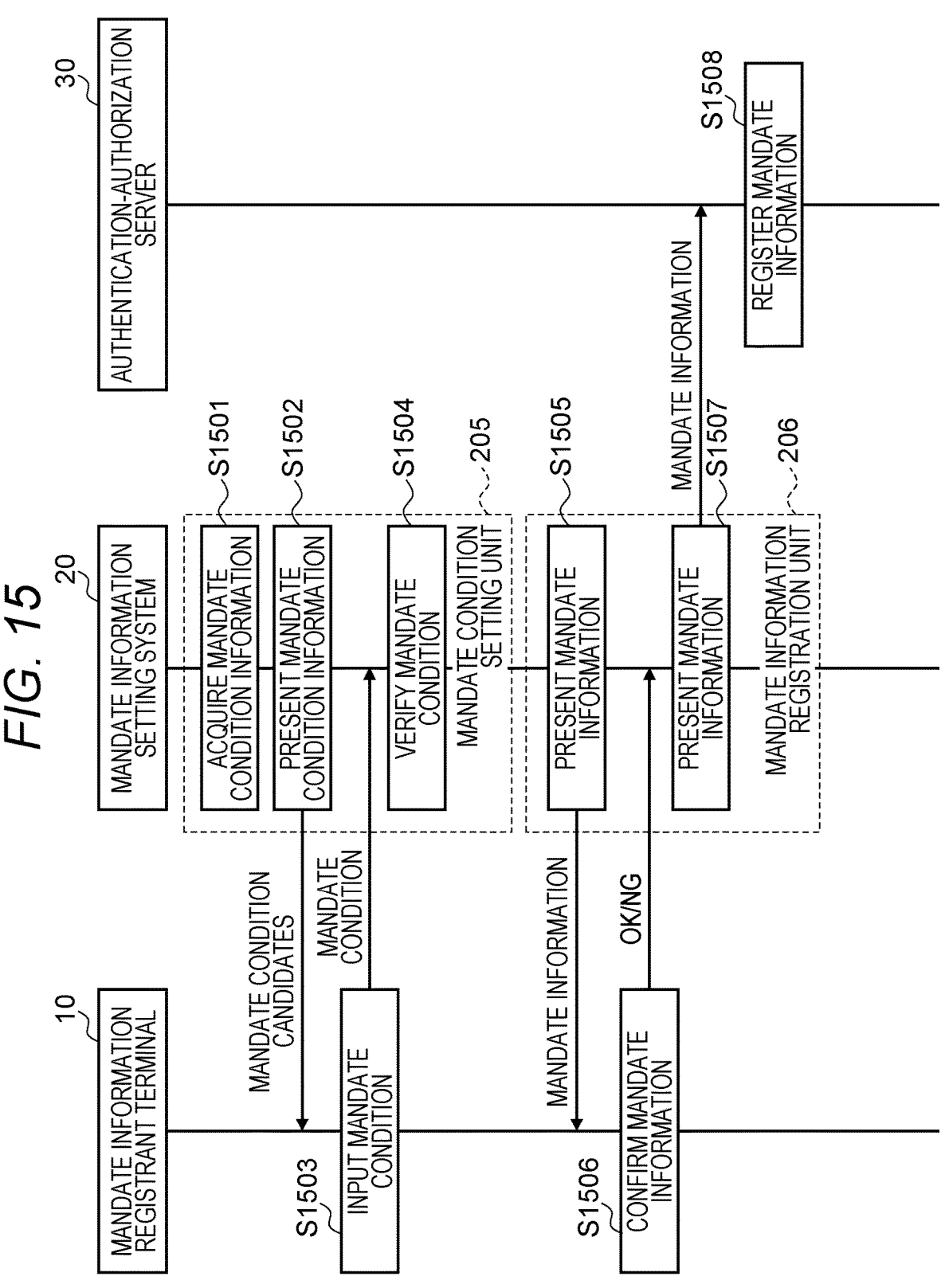
FIG. 15 is a sequence diagram illustrating Processing 2 and 3.

FIG. 15 is a sequence diagram illustrating Processing 2 and 3.

Here, as per FIG. 12, the exchange of information between the mandate information registrant terminal 10 (mandate information registrant), the mandate information setting system 20, and the authentication-authorization server 30 is illustrated.

Processing 2 and 3 will be described below with reference to FIGS. 11 and 15.

First, the mandate condition setting unit 205 acquires, from the mandate condition table 212, mandate condition candidates which can be set by the mandate information registrant (mandate condition information acquisition) (S1501). That is, candidates that can be set by the mandator are selected as mandate condition candidates. This action is performed by sending a query requesting mandate condition candidates to the mandate condition table 212 and acquiring the corresponding user information from the mandate condition table 212.

Next, the mandate condition setting unit 205 presents the acquired mandate condition candidates on a screen (presentation of mandate condition information) (S1502). In addition, the mandate condition setting unit 205 presents a screen for selecting a mandate condition candidate, and the mandate information registrant selects a mandate condition from among the mandate condition candidates and inputs the mandate condition (S1503). At this time, the mandate condition setting unit 205 may present options in a form for selection by the mandate information registrant, or the mandate information registrant may input information (numerical values or the like) related to the options. The former corresponds to, for example, a case where a designated number or more of service years are to be selected, and the latter corresponds to a case where the service years are to be inputted.

Next, the mandate condition setting unit 205 verifies that the mandate condition is satisfied by the mandatary from the mandatary attribute information (S1504).

By means of S1501 to S1504, the mandate condition setting unit 205 is capable of performing Processing 2 to set a mandate condition.

Next, the mandate information registration unit 206 presents the mandate information acquired in Processing 1 and 2 on the screen (S1505).

The mandate information registrant confirms and approves the mandate information (S1506). Note that, in the case of disapproval, the processing starts again from processing 1.

The mandate information registration unit 206 presents the registered mandate information, and transmits the mandate information to the authentication-authorization server 30 if the mandate information registrant approves the mandate information (S1507).

Next, the authentication-authorization server 30 registers the mandate information in the mandate information management table 312 (S1508).

By means of S1505 to S1508, the mandate information registration unit 206 is capable of performing Processing 3 and of registering the mandate information in the authentication-authorization server 30.

The mandate condition setting unit 205 functions as a second presentation unit that presents, as second input candidates, mandate condition candidates, which are the mandate information candidates other than that of the first input candidates and which are candidates for the mandate condition defined by the mandator as a mandatary condition.

In addition, as illustrated in S1504 of FIG. 15, the mandate condition setting unit 205 verifies whether the mandatary satisfies the mandate condition selected from among the mandate condition candidates.

Next, the mandate information registration unit 206 registers the mandate information selected from the first input candidates and the second input candidates.

<Description of User Interface (UI)>

Next, a UI for when the mandate information registrant is to set the mandate information by using the mandate information registrant terminal 10 in Processing 1 to 3 will be described.

Figure 16:
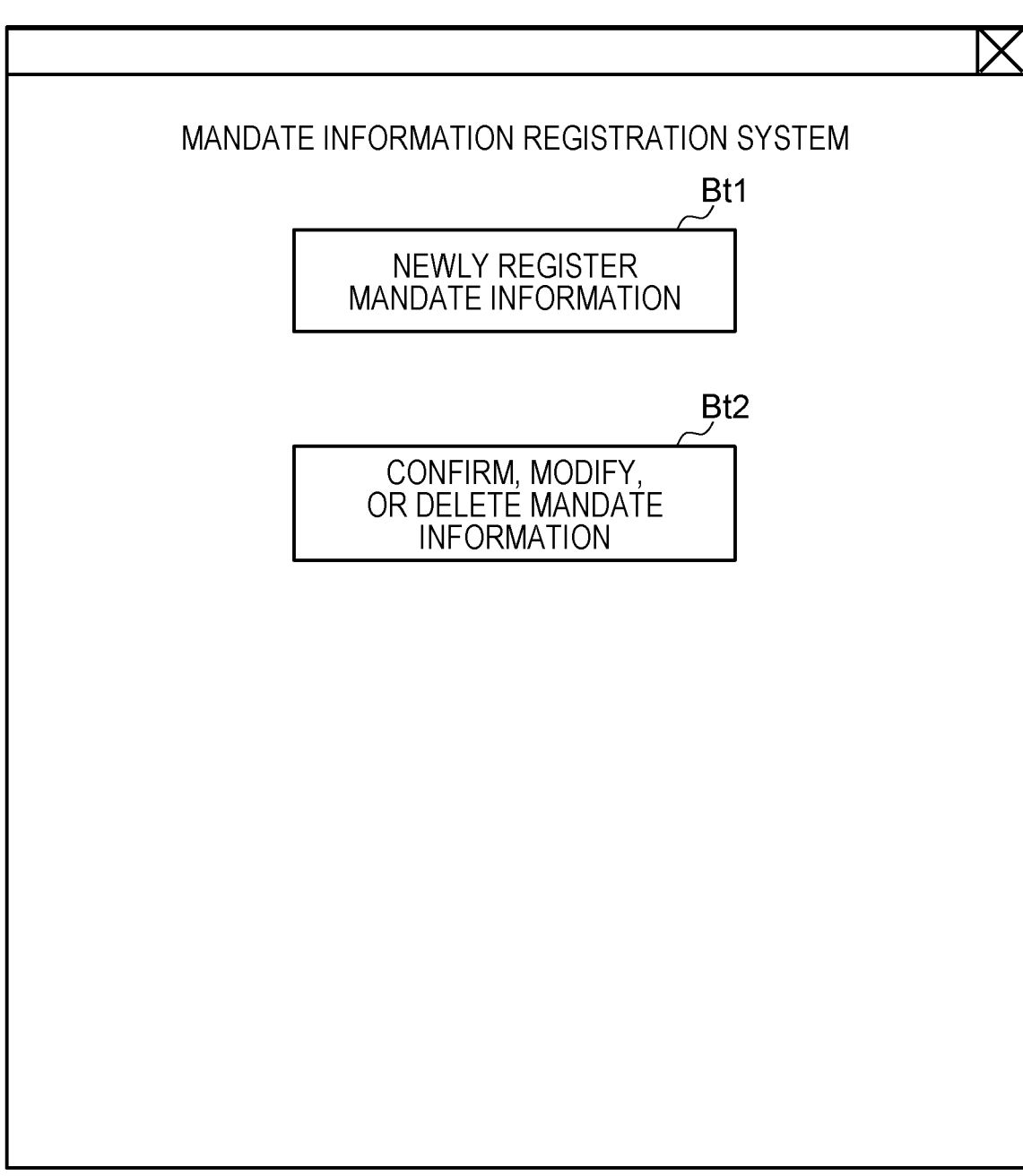
FIG. 16 is a screen displayed when the mandate information registrant makes a mandate information setting request in S1201 of FIG. 12.

FIG. 16 is a screen which is displayed when the mandate information registrant issues a mandate information setting request in S1201 of FIG. 12.

The illustrated screen is a so-called home screen. On this screen, a button Bt1 for newly registering the mandate information and a button Bt2 for confirming, changing, and deleting the mandate information are displayed. When the mandate information registrant presses the button Bt1, the processing of S1202 and subsequent processing is started.

FIG. 17 illustrates a screen on which mandator candidates are presented on the screen in S1206 to S1207 in FIG. 12, and the mandate information registrant selects a mandator from among the mandator candidates and inputs the mandator.

It can be seen that a pull-down menu Pm1 is displayed on the illustrated screen, and that users whose usernames are A-1 to A-4 are displayed as mandator candidates. Next, for example, when the mandate information registrant selects user A-1 and presses the OK button Bt3, user A-1 is selected and inputted.

FIG. 18 illustrates a screen on which mandate content candidates are presented on the screen in S1210 to S1211 in FIG. 12, and the mandate information registrant selects mandate content from among the mandate content candidates and inputs the mandate content.

It can be seen that a pull-down menu Pm2 is displayed on the illustrated screen, and "use signing key" and "reference signing key" are displayed as the mandate content candidates. Next, for example, when the mandate information registrant selects "use signing key" and presses the OK button Bt4, "use signing key" is then selected and inputted.

Figure 19:
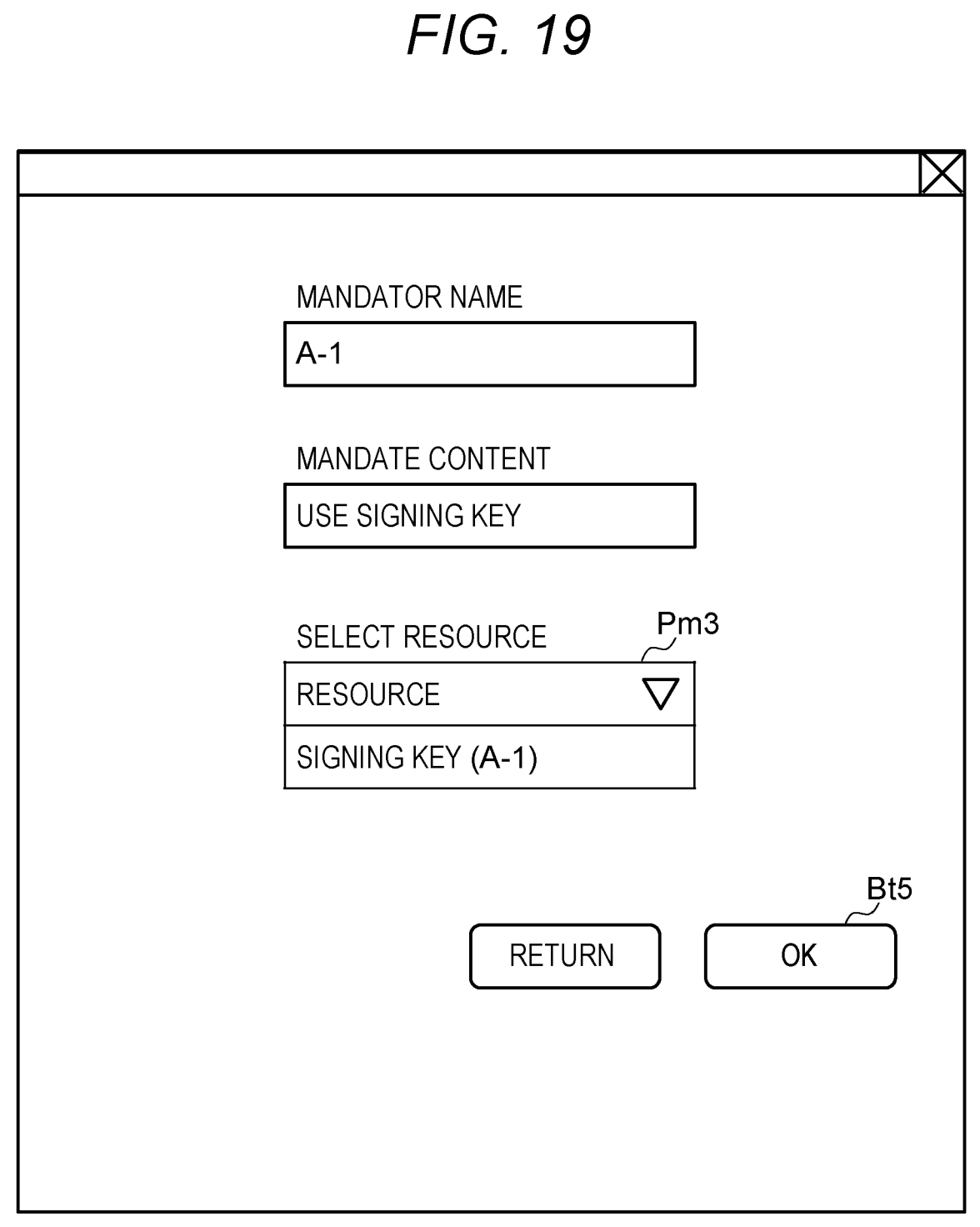

FIG. 19 illustrates a screen on which resource candidates are presented on the screen in S1210 to S1211 in FIG. 12, and the mandate information registrant selects a resource from among the resource candidates and inputs the resource.

It can be seen that a pull-down menu Pm3 is displayed on the illustrated screen, and that "signing key (A-1)" is displayed as the resource candidate. Next, for example, when the mandate information registrant selects "signing key (A-1)" and presses the OK button Bt5, "signing key (A-1)" is selected and inputted.

FIG. 20 illustrates a screen on which mandatary candidates are presented on a screen in S1215 to S1216 of FIG. 12, and the mandate information registrant selects a mandatary from among the mandatary candidates and inputs the mandatary.

It can be seen that a pull-down menu Pm4 is displayed on the illustrated screen, and that users whose usernames are B-1 to B-4 are displayed as mandatary candidates. Next, for example, when the mandate information registrant selects user B-1 and presses the OK button Bt6, user B-1 is selected and inputted.

Note that the setting content may be temporarily stored when processing 1 ends, another mandate information registrant may be asked to register the mandate information, and the request may be executed starting from processing 2. This is, for example, a case where the processing 1 is performed by the system administrator, and the processing 2 and subsequent processing are performed by the mandator himself/herself, or the like.

FIG. 21 is a diagram illustrating such a case and illustrates a screen for temporarily saving the content set up until FIG. 20 as basic information.

A dialog box Db1 is displayed on the illustrated screen, and when an OK button Bt7 is pressed in response to the message "Would you like to use the above content to register basic information?", the basic information is registered.

FIG. 22 illustrates a screen on which the mandate condition candidates are presented on a screen in S1502 to S1503 of FIG. 15, and the mandate information registrant selects a mandate condition from among the mandate condition candidates and inputs the mandate condition.

It can be seen that a pull-down menu Pm5 is displayed on the illustrated screen, and "in the same department" and "position: ☐☐ or higher" are displayed as mandate condition candidates. Further, for example, when the mandate information registrant selects "in the same department" and presses the OK button Bt8, "in the same department" is selected and inputted.

FIG. 23 illustrates a screen on which the mandate information registrant confirms and approves the mandate information in S1506 of FIG. 15.

A dialog box Db2 is displayed on the illustrated screen, and when an OK button Bt9 is pressed in response to the message "Would you like to use the above content to register the mandate information?", the mandate information is registered.

Figure 24:
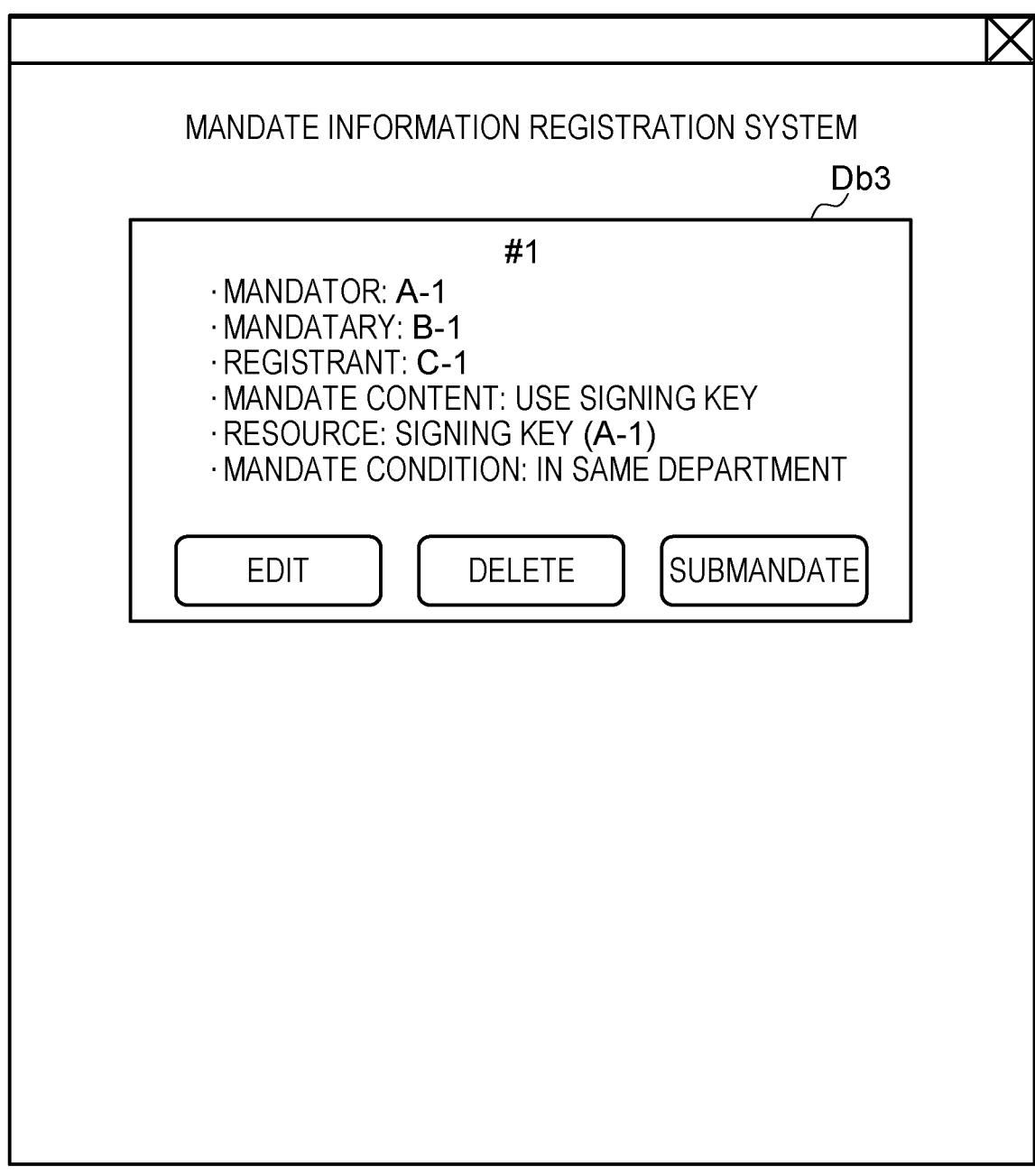
FIG. 24 illustrates a screen for presenting registered mandate information in S1507 of FIG. 15.

FIG. 24 illustrates a screen for presenting registered mandate information in S1507 of FIG. 15.

On the illustrated screen, a dialog box Db3 is displayed, and the mandate information to be registered is displayed.

FIG. 25 is a diagram illustrating registered mandate information.

Here, it can be seen that mandate information has been registered with user A-1 as the mandator, user B-1 as the mandatary, user C-1 as the registrant (mandate information registrant), "use signing key" as the mandate content, "signing key (A-1)" as the resource (resource owned by the mandator)", and "in the same department" as the mandate condition.

Modification

Next, a modification of the above-described mandate information setting system 20 will be described.

In the modification, not only is the mandator able to issue a mandate to the mandatary, the mandatary is also able to issue a submandate to a submandatary.

Figure 26:
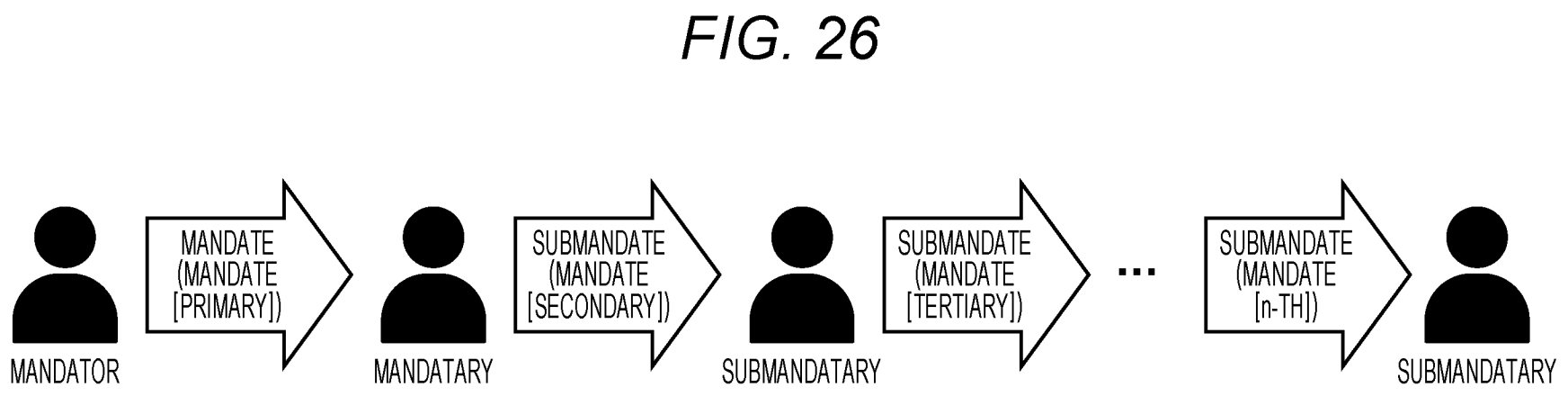

FIG. 26 is a diagram to illustrate a submandate.

First, the mandator issues a mandate (mandate [primary]) to the mandatary. This mandate (mandate [primary]) can be performed using the method described above.

Meanwhile, in the present embodiment, the mandatary is able to issue a submandate (mandate [secondary]) to a submandatary. Note that it is also conceivable for a submandatary to issue a submandate (mandate [tertiary]) to another submandatary. That is, it is conceivable for a submandate to be issued any number of times. In FIG. 26, a case where mandates are issued n times is illustrated in the form of submandates (mandate [nth order]).

However, in a case where a submandate is to be performed, there is a possibility of a mandate being performed by an unintended party. Furthermore, it may be desirable to add a mandate condition for each submandatary. Therefore, in the present embodiment, for the former, the range of conditions set in the mandate information is made the same or smaller each time a submandate is performed. That is, the range of the conditions set in the mandate information at the time of the submandate cannot be increased. In addition, a condition that has been set in the mandate information can be added to the latter. The range of the conditions set in the mandate information is, for example, a range in which the number of submandates is limited and a submandatable range for employment positions or the like.

Figure 27:
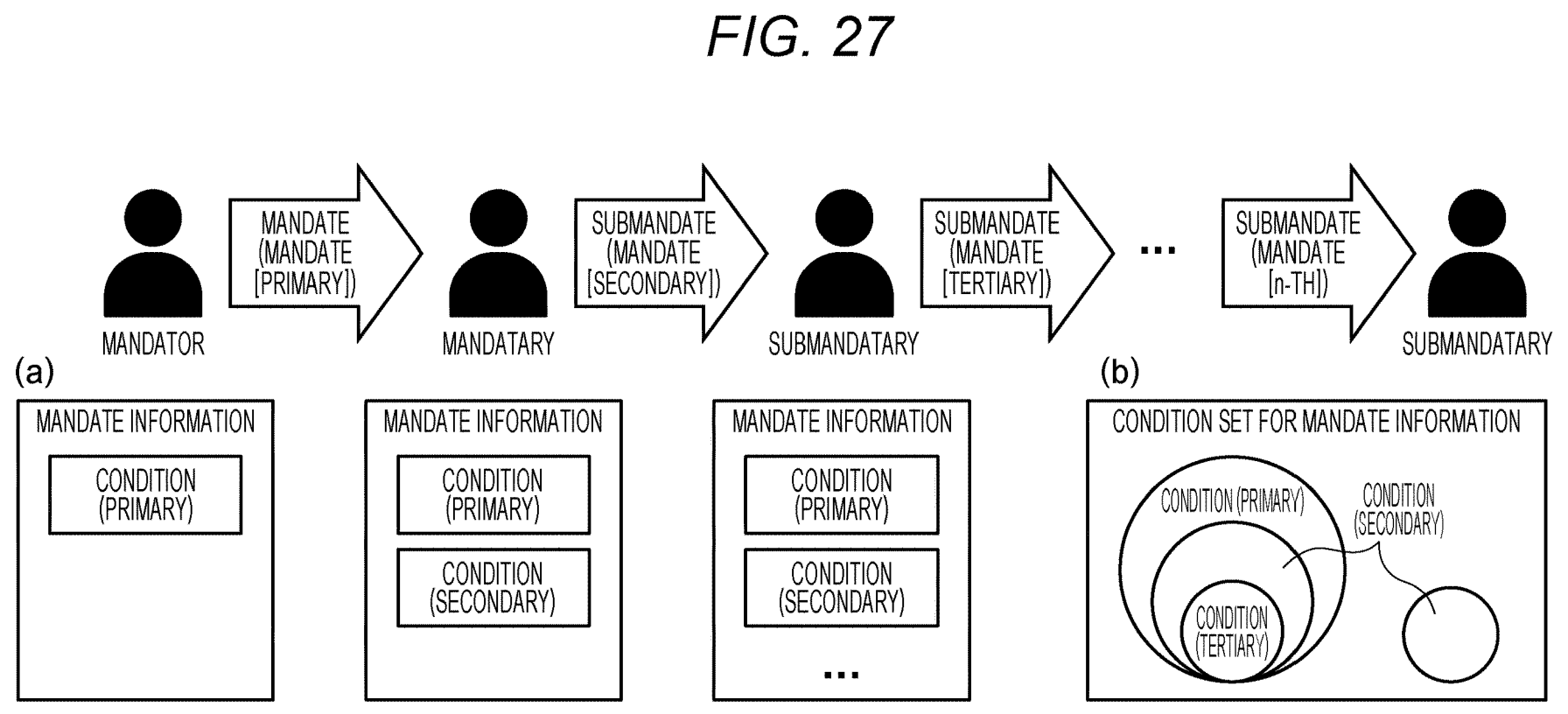

FIGS. 27(a) and 27(b) are diagrams illustrating a range of conditions set in the mandate information at the time a submandate is issued.

Among these diagrams, FIG. 27(a) is a diagram illustrating the conditions set in the mandate information. Here, the condition set in the mandate information of the mandator is a condition (primary). In addition, the condition set in the mandate information of the mandatary indicates a case where a condition (secondary) is added in addition to the condition (primary). Further, the conditions set in the mandate information of the submandatary submandated by the mandatary are the condition (primary) and the condition (secondary), similarly to the mandatary.

At such time, in a case where a condition (secondary) is to be added, in the event of a condition relating to an upstream mandate condition, the condition cannot be broader than the upstream mandate condition. Methods of verifying the mandate condition include methods such as determining a relationship from an employment position tree structure, and determining a relationship from a qualification information tree structure. The left diagram in FIG. 27(b) illustrates this case, and illustrates a case where the range of the condition (secondary) is smaller than the range of the condition (primary). In addition, a case is illustrated where, when the condition (tertiary) is added, the range of the condition (tertiary) is smaller than the range of the condition (secondary). Note that, in a case where the condition is not related to the upstream mandate condition, the condition can be added without being bound by such a constraint, as illustrated in the right diagram of FIG. 27(b).

Figure 28:
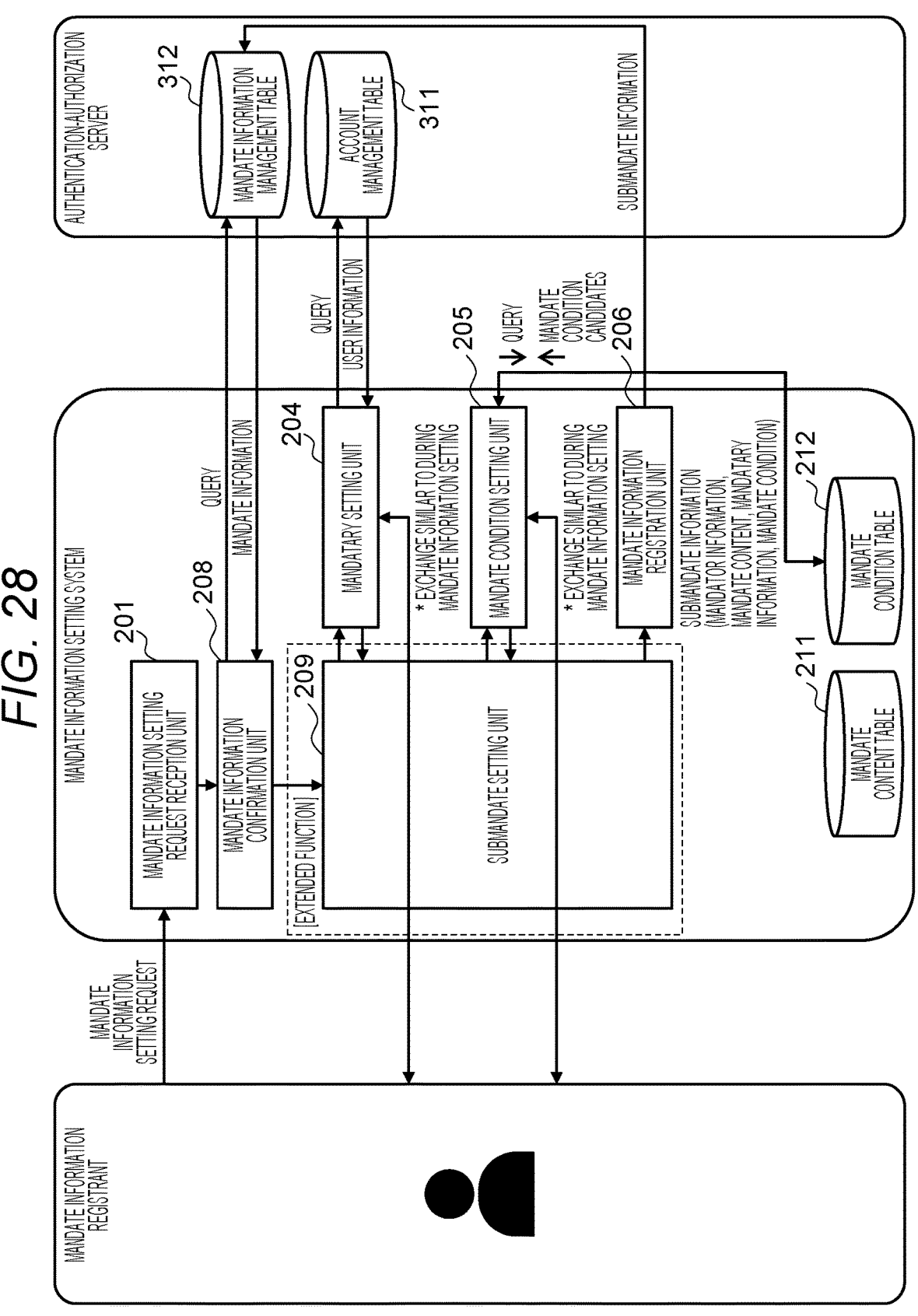
FIG. 28 is a diagram illustrating an operation of the mandate information setting system when performing a submandate.
Figure 29:
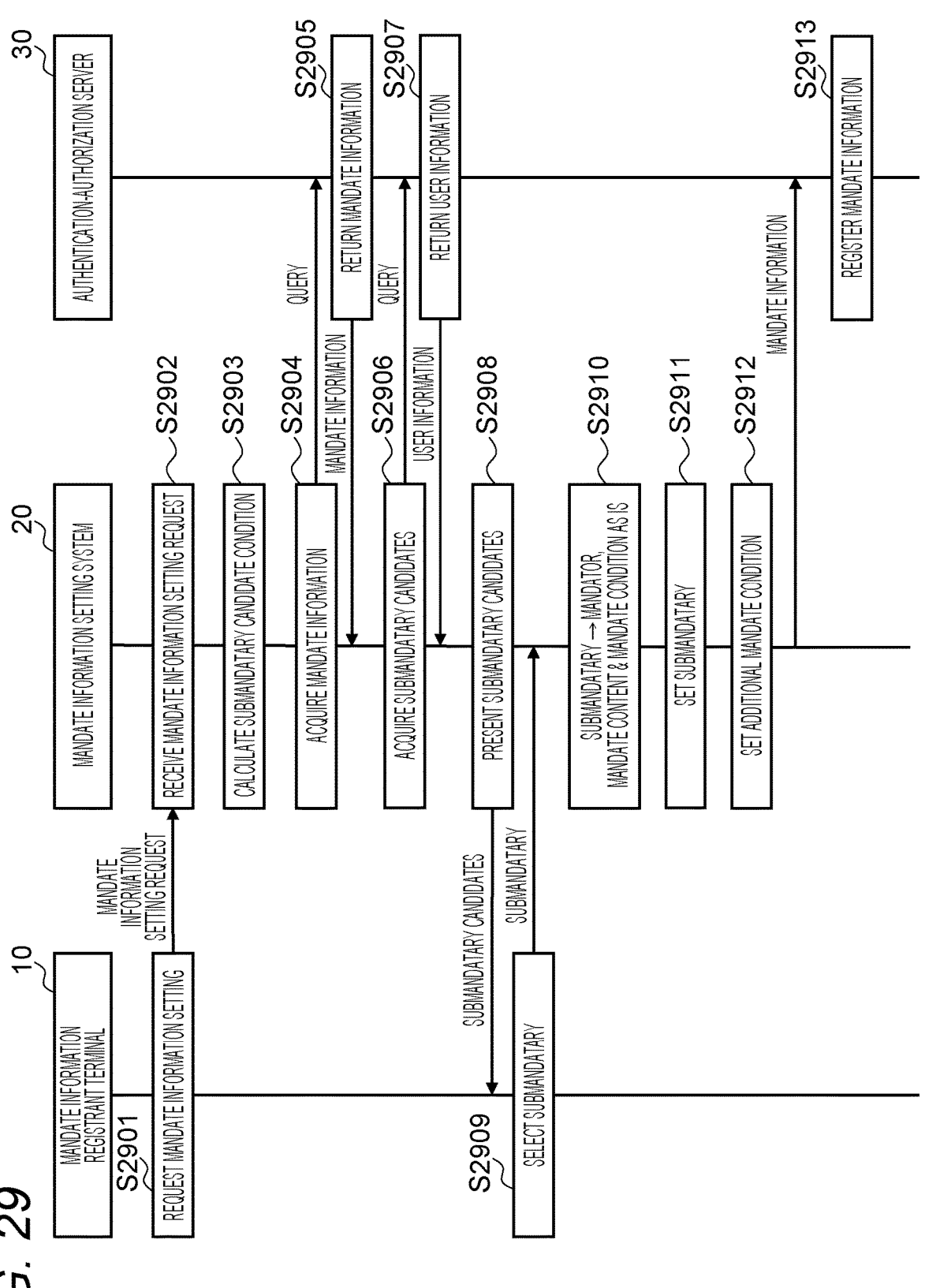
FIG. 29 is a sequence diagram illustrating processing at the time of performing a submandate.

FIG. 28 is a diagram illustrating an operation of the mandate information setting system 20 when a submandate is to be performed. Further, FIG. 29 is a sequence diagram illustrating processing at the time a submandate is to be performed.

First, the mandate information registrant issues a mandate information setting request, which is a request to set mandate information, from the mandate information registrant terminal 10 (S2901). Next, the mandate information setting request reception unit 201 receives the mandate information setting request (S2902).

Next, the submandate setting unit 209 performs submandatary candidate condition calculation processing as processing to calculate a submandatary candidate condition that can be set by the mandate information registrant (S2903).

Next, the mandate information confirmation unit 208 acquires, from the authentication-authorization server 30, mandate information in the mandate information setting unit 302 of the authentication-authorization server 30 (S2904). This action is performed by sending a query requesting the mandate information to the authentication-authorization server 30, and the authentication-authorization server 30 returning the corresponding mandate information (S2905). Note that the mandate information registrant is, for example, a mandatary.

Next, the submandate setting unit 209 acquires user information having the submandatary candidate condition from the authentication-authorization server 30 (S2906). This action is performed by sending a query requesting the user information having a submandatary candidate condition to the authentication-authorization server 30, and the authentication-authorization server 30 returning the corresponding user information (S2907).

Upon receiving the user information, the submandate setting unit 209 presents the corresponding users on the screen as submandatary candidates (S2908). At the same time, the submandate setting unit 209 presents a screen for selecting a submandatary candidate, and the mandate information registrant selects a submandatary from among the submandatary candidates and inputs the submandatary (S2909).

The submandatary can be set by means of the above processing.

Next, the submandate setting unit 209 sets the mandatary of the mandate information as the mandator, and sets the mandate content and the mandate condition as the mandate information without further processing (S2910).

In addition, the submandate setting unit 209 takes the mandate content as an input, calls the mandatary setting unit 204, and sets the mandatary (in this case, the submandatary) as the mandate information (S2911).

Furthermore, the submandate setting unit 209 takes the mandate content as an input, calls the mandate condition setting unit 205, and sets an additional mandate condition (S2912).

The mandate information set thus far is then taken as an input of the submandate information, the mandate information registration unit 206 is called, and the submandate information is registered (S2913).

By means of S2903 to S2913, the submandate setting unit 209 is capable of registering the submandatary in the authentication-authorization server 30.

<Description Modification UI>

Next, in a modification, a UI for when the mandate information registrant is to set the submandate information by using the mandate information registrant terminal 10 will be described.

FIG. 30 illustrates a screen on which the mandate information registrant confirms and approves submandate information.

In this case, a dialog box Db4, which is illustrated in FIG. 23, is displayed. The dialog box Db4 is the same diagram except that the mandate condition in the dialog box Db2 of FIG. 23 becomes the submandate condition. Next, when the OK button Bt10 is pressed in response to the message "Would you like to use the above content to register submandate information?", the mandate information is registered.

Figure 31:
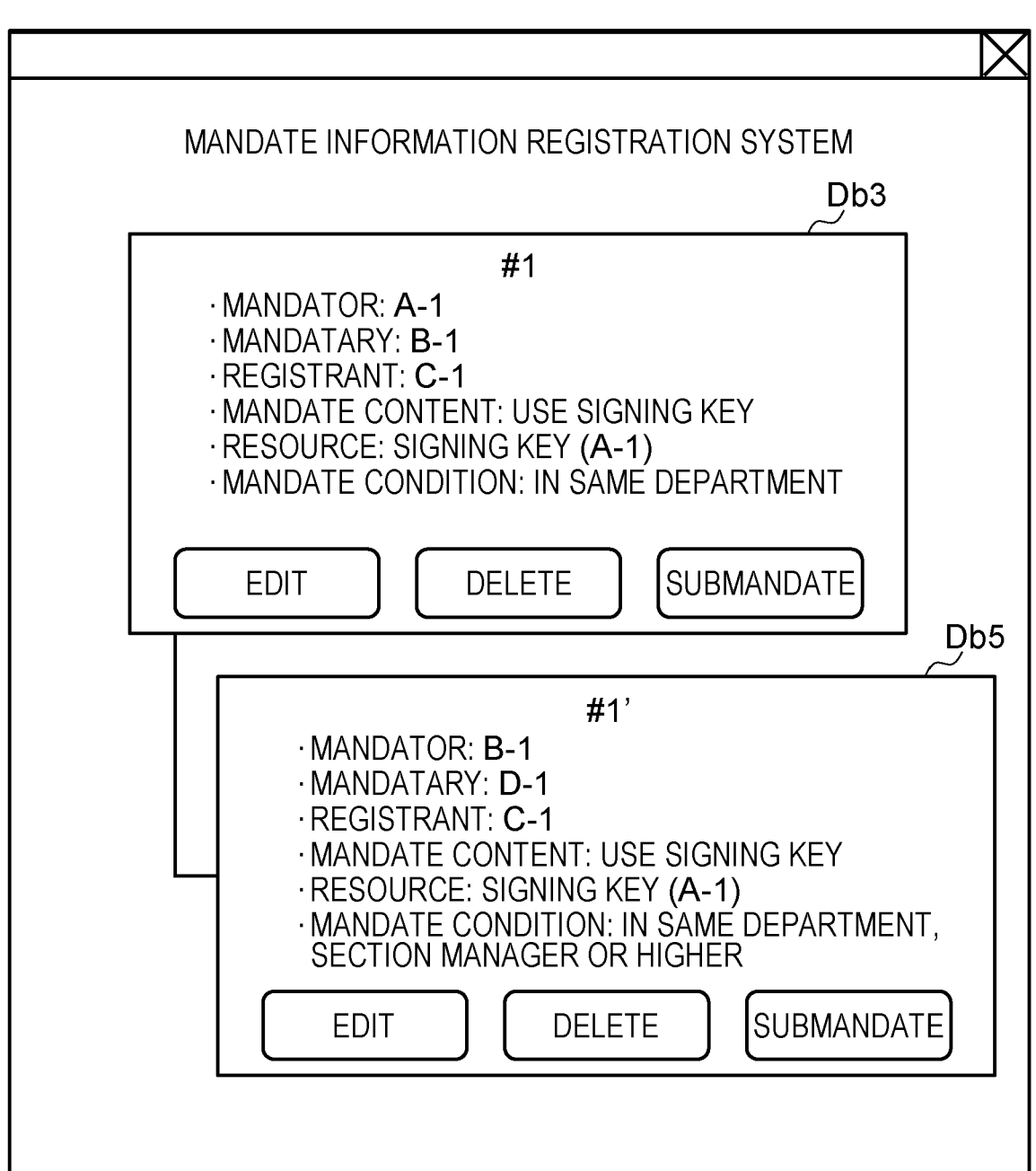
FIG. 31 illustrates a screen for presenting the registered submandate information.

FIG. 31 illustrates a screen for presenting the registered submandate information.

In this case, a dialog box Db3, which is illustrated in FIG. 24, is displayed, and the mandate information is displayed. Here, a dialog box Db5 is also displayed, and registered submandate information is displayed. Here, it can be seen that mandate information has been registered with user B-1 as the mandator, user D-1 as the mandatary, user C-1 as the registrant (mandate information registrant), "use signing key" as the mandate content, "signing key (A-1)" as the resource (resource owned by the mandator)", and "in the same department" as the mandate condition.

The respective pieces of information of the mandator, the mandate content, and the mandatary are not independent information but are related to each other. It is thus possible to narrow down the input candidates of other information by using each of these pieces of information. In the present embodiment, the mandate information setting system 20 is used to perform registration in the following order: mandator-mandate content-mandatary, and thus candidates that can be registered in the following setting items are narrowed down on the mandate information setting system 20 side, presented to the mandate information registrant, and the mandator, the mandate content, and the mandatary are set. As a result, the burden on the mandate information registrant is reduced, and the mandate information can be registered more easily. In addition, it is possible to suppress errors in the setting of mandate information by the mandate information registrant. That is, the mandate information can be registered more accurately. It is also possible to register mandate information reflecting the intentions of the mandate information registrant. In the present embodiment, the registration is performed in the following order: mandator-mandate content-mandatary, but the order of registration of the mandator, the mandate content, and the mandatary is not limited thereto, rather, the registration may be performed in any order. At such time, similarly to the procedure described in the present embodiment, it is possible to register the mandate information more easily by narrowing down candidates for the information (mandator, mandate content, mandatary) to be set next by using the previously registered information (mandator, mandate content, mandatary). In addition, it is possible to suppress errors in the setting of mandate information by the mandate information registrant. That is, the mandate information can be registered more accurately.

Further, in the present embodiment, the mandate information setting system 20 uses the above-described method to set, in processing 1, the mandator, the mandate content, and the mandatary as mandate information that can be mechanically calculated based on the user information and the like, but, in processing 2, sets a mandate condition as mandate information that cannot be mechanically calculated based on the user information and the like. In this manner, by separating processing 1 and processing 2 and setting the mandate information, it is possible to set mandate information that reflects the intentions of the mandate information registrant.

Note that, conventionally, there is no method at present that uses the above method to set a mandator, mandate content, a mandatary, and a mandatary condition.

According to the modification, in a case where a submandate is to be performed, the possibility of the mandate being performed by an unintended party is reduced. Mandate conditions can also be added for each submandatary.

Although the mandate information setting system 20, the authentication-authorization server 30, and the resource server 40 described in detail above are described as separate devices, any two or more of them may be integrated with each other. For example, the mandate information setting system 20 may be incorporated as a function in the authentication-authorization server 30 or the resource server 40. In addition, some functions of the mandate information setting system 20, the authentication-authorization server 30, and the resource server 40 may be provided as separate devices.

Furthermore, there may be one or more mandators and mandataries that can be registered at one time. A group of users may be designated and registered as the mandator and mandatary. Similarly, any number of pieces of mandate content may be registered at one time. Likewise, there may be any number of mandate conditions. Moreover, mandate conditions need not be set.

<Description of Operation Support Method>

The processing performed by the mandate information setting system 20 described hereinabove is realized through cooperation between software and hardware resources. That is, the processor 101 in the computer provided in the mandate information setting system 20 loads software for realizing each of the above-described functions into the main storage device 102 and executes the software to realize the functions.

Accordingly, the processing performed by the mandate information setting system 20 can be regarded as a mandate processing method implemented by a processor executing a program recorded in memory, the method including: when a mandate is issued by a mandator to a mandatary, presenting, as first input candidates, mandate information candidates, which can be determined based on user information of the mandator and the mandatary and which is information for performing the mandate; presenting, as second input candidates, mandate condition candidates, which are the mandate information candidates other than the first input candidates and which are candidates for a mandate condition defined by the mandator as a condition for the mandatary; and registering mandate information selected from the first input candidates and the second input candidates.

Although the present embodiment has been described above, the technical scope of the present invention is not limited to or by the scope disclosed in the foregoing embodiment. It is evident from the disclosures of the patent claims that the addition of various changes or improvements to the foregoing embodiment falls within the technical scope of the present invention.

What is claimed is:

1. A mandate processing device comprising:
a processor; and
a memory storing instructions that, when executed by the processor, cause the mandate processing device to:
when a mandate is to be issued from a mandator to a mandatary, query an account management table storing user information to determine first input candidates comprising mandate information candidates based on user information of the mandator and the mandatary, wherein the mandate information candidates are information for performing the mandate;
query a mandate condition table to determine second input candidates comprising mandate condition candidates, which are the mandate information candidates other than the first input candidates and which are candidates for a mandate condition defined by the mandator as a condition for the mandatary;
present the first input candidates and the second input candidates on a display device;
receive selections from the first input candidates and the second input candidates; and
register mandate information based on the received selections in a mandate information management table of an authentication-authorization server.

2. The mandate processing device according to claim 1, wherein the first input candidates include mandator candidates determined based on the user information.

3. The mandate processing device according to claim 2, wherein a user satisfying a condition for becoming a mandator candidate is selected as one of the mandator candidates based on the user information.

4. The mandate processing device according to claim 3, wherein the first input candidates further include mandate content candidates, which are candidates for mandate content required based on an authority of the mandator selected from among the mandator candidates.

5. The mandate processing device according to claim 4, wherein the mandate content candidates are obtained based on a resource owned by the mandator selected from among the mandator candidates.

6. The mandate processing device according to claim 5, wherein the first input candidates include mandator resource candidates obtained from the mandate content candidates.

7. The mandate processing device according to claim 4, wherein the first input candidates include mandatary candidates, which are candidates for the mandatary that are obtained based on an authority required by the mandatary and determined from the mandate content selected from among the mandate content candidates.

8. The mandate processing device according to claim 1, wherein the mandate information includes information of the mandator, mandate content, resources owned by the mandatary and the mandator, and the mandate condition.

9. The mandate processing device according to claim 1, wherein the processor verifies whether the mandatary satisfies the mandate condition selected from among the mandate condition candidates.

10. The mandate processing device according to claim 1, further comprising a submandate setting unit that, when a submandate is to be issued, sets a submandatary,
wherein the submandate setting unit presents submandatary candidates who are candidates for the submandatary.

11. The mandate processing device according to claim 10, wherein the submandate setting unit makes a range of conditions, which are set in the mandate information, the same or smaller each time a submandate is performed.

12. The mandate processing device according to claim 11, wherein the conditions set in the mandate information are at least one of a restriction on a number submandates and a submandatable range.

13. The mandate processing device according to claim 10, wherein the submandate setting unit is capable of adding a condition to be set in the mandate information.

14. The mandate processing device according to claim 1, wherein the processor is further configured to verify that the mandatary satisfies the mandate condition by comparing attribute information of the mandatary from the account management table against the mandate condition selected from the mandate condition candidates before registering the mandate information.

15. The mandate processing device according to claim 1, wherein determining the first input candidates comprises:

calculating a mandator candidate condition based on logged-in user information;

querying the account management table to retrieve user information satisfying the mandator candidate condition;

extracting mandate content candidates from a mandate content table based on authority attribute values of a selected mandator from the account management table; and calculating a mandatary candidate condition based on authority requirements specified in the mandate content table for selected mandate content.

16. The mandate processing device according to claim 1, wherein the account management table stores, for each user, a username, password, department attribute, position attribute, owned resources attribute, and qualifications held attribute, and wherein determining the first input candidates comprises extracting mandate content candidates by matching the owned resources attribute of a selected mandator against mandator resource requirements specified in the mandate content table.

17. The mandate processing device according to claim 1, wherein the processor is further configured to:

when a submandate is to be issued from a mandatary to a submandatary, retrieve existing mandate information for the mandatary from the mandate information management table;

determine submandatary candidates by querying the account management table based on authority requirements from the existing mandate information;

receive a selection of a submandatary and an additional mandate condition; and register submandate information in the mandate information management table with a range of conditions that is the same as or smaller than conditions in the existing mandate information.

18. The mandate processing device according to claim 1, wherein the mandate information management table stores, for each registered mandate, a mandator identifier, mandate content, resource identifier, mandate authority, mandatary identifier, mandate condition, and mandate information registrant identifier, and wherein the processor validates that the selected mandatary possesses qualifications specified in a mandatary condition field of the mandate content table before completing registration of the mandate information.

19. A mandate processing method implemented by a processor executing a program recorded in memory, the method comprising:

when a mandate is to be issued from a mandator to a mandatary, querying an account management table storing user information to determine first input candidates comprising mandate information candidates based on user information of the mandator and the mandatary, wherein the mandate information candidates are information for performing the mandate;

querying a mandate condition table to determine second input candidates comprising mandate condition candidates, which are the mandate information candidates other than the first input candidates and which are candidates for a mandate condition defined by the mandator as a condition for the mandatary;

presenting the first input candidates and the second input candidates on a display device;

receiving selections from the first input candidates and the second input candidates; and registering mandate information based on the received selections in a mandate information management table of an authentication-authorization server.

20. A mandate processing system comprising:

a mandate processing device that, when a mandate is to be issued from a mandator to a mandatary, performs setting of mandate information; and a mandate management device that, based on the mandate information, grants mandatary permission to process a mandate content, wherein the mandate processing device includes:

a processor; and a memory storing instructions that, when executed by the processor, cause the mandate processing device to:

when a mandate is to be issued from the mandator to the mandatary, query an account management table storing user information to determine first input candidates comprising mandate information candidates based on user information of the mandator and the mandatary, wherein the mandate information candidates are information for performing the mandate;

query a mandate condition table to determine second input candidates comprising mandate condition candidates, which are the mandate information candidates other than the first input candidates and which are candidates for a mandate condition defined by the mandator as a condition for the mandatary;

present the first input candidates and the second input candidates on a display device;

receive selections from the first input candidates and the second input candidates; and register mandate information based on the received selections in a mandate information management table of an authentication-authorization server.

* * * * *